United States Patent
Araki

(10) Patent No.: US 10,968,359 B2
(45) Date of Patent: Apr. 6, 2021

(54) ACTINIC-RAY-CURABLE INK COMPOSITION AND INK JET RECORDING METHOD

(71) Applicant: FUJIFILM CORPORATION, Tokyo (JP)

(72) Inventor: Kenjiro Araki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/460,982

(22) Filed: Jul. 2, 2019

(65) Prior Publication Data

US 2019/0322886 A1    Oct. 24, 2019

Related U.S. Application Data

(63) Continuation of application No. PCT/JP2018/002802, filed on Jan. 29, 2018.

(30) Foreign Application Priority Data

Jan. 30, 2017   (JP) .............................. JP2017-014642

(51) Int. Cl.
   *C09D 11/38*      (2014.01)
   *B41M 7/00*       (2006.01)

(52) U.S. Cl.
   CPC ........... *C09D 11/38* (2013.01); *B41M 7/0081* (2013.01)

(58) Field of Classification Search
   None
   See application file for complete search history.

(56) References Cited

FOREIGN PATENT DOCUMENTS

| EP | 2669342 A1 * | 12/2013 | ........... C09D 11/324 |
|----|---|---|---|
| EP | 2669342 A1 | 12/2013 | |
| EP | 3002321 A1 | 4/2016 | |
| JP | 2009-149719 A | 7/2009 | |
| JP | 2007-231232 A | 9/2009 | |
| JP | 2009-197194 A | 9/2009 | |
| JP | 2011-012224 A | 1/2011 | |
| JP | 2011-57744 A | 3/2011 | |
| JP | 2011-241323 A | 12/2011 | |
| JP | 2012-193275 A | 10/2012 | |
| WO | 2013/054317 A1 | 4/2013 | |

OTHER PUBLICATIONS

English language translation of the following: Office action dated Apr. 7, 2020 from the JPO in a Japanese patent application No. 2018-564696 corresponding to the instant patent application.
Extended European Search Report dated Apr. 3, 2020, issued in corresponding EP Patent Application No. 18745075.4.
Office Action dated Jan. 8, 2020, issued by the EPO in corresponding EP Patent Application No. EP18745075.4.

International Search Report issued in International Application No. PCT/JP2018/002802 dated Mar. 20, 2018.
Written Opinion of the ISA issued in International Application No. PCT/JP2018/002802 dated Mar. 20, 2018.

(Continued)

Primary Examiner — Erica S Lin
(74) Attorney, Agent, or Firm — Solaris Intellectual Property Group, PLLC

(57) ABSTRACT

An actinic-ray-curable ink composition is provided, the composition including: a di(meth)acrylate having a linear alkylene group; a di(meth)acrylate having an alkylene oxide chain; a cyclohexyldienone-based polymerization inhibitor that includes at least one selected from the group consisting of a compound represented by Formula (1) below and a compound represented by Formula (2) below; and a photopolymerization initiator,

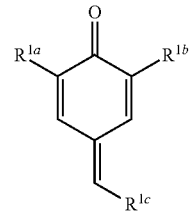

(1)

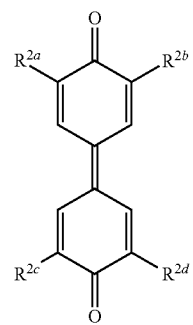

(2)

in which, in Formula (1), $R^{1a}$ and $R^{1b}$ each independently represent an alkyl group having 1 to 8 carbon atoms, $R^{1c}$ represents a phenyl group or a cyclohexyl group, and in which, in Formula (2), $R^{2a}$, $R^{2b}$, $R^{2c}$, and $R^{2d}$ each independently represent an alkyl group having 1 to 8 carbon atoms.

16 Claims, No Drawings

(56) References Cited

OTHER PUBLICATIONS

English language translation of the following: Office action dated Jun. 2, 2020 from the JPO in a Japanese patent application No. 2018-564696 corresponding to the instant patent application. This office action translation is submitted now in order to supplement the understanding of the cited references which are being disclosed in the instant Information Disclosure Statement.

* cited by examiner

ACTINIC-RAY-CURABLE INK COMPOSITION AND INK JET RECORDING METHOD

CROSS-REFERENCE TO RELATED APPLICATIONS

This application is a continuation application of International Application No. PCT/JP2018/002802, filed Jan. 29, 2018, the disclosure of which is incorporated herein by reference in its entirety. Further, this application claims priority from Japanese Patent Application No. 2017-014642, filed Jan. 30, 2017, the disclosure of which is incorporated herein by reference in its entirety.

BACKGROUND OF THE INVENTION

1. Field of the Invention

The present disclosure relates to an actinic-ray-curable ink composition and an ink jet recording method.

2. Description of the Related Art

There are known actinic-ray-curable ink compositions, which are irradiated with actinic rays to cure the inks.

For example, as an ink jet ink composition having high preservation stability, exhibiting stable ejection performance for a long period to thereby enable stable drawing of fine and high-quality images on coated paper, and exhibiting high curability, there is a known actinic-energy-ray-curable ink jet ink composition containing a diacrylate monomer having a linear or branched structure having 10 carbon chains (refer to JP2012-193275A, for example).

In addition, as an ink composition that is stable for a long period and provides clear layers that do not become fogged or yellow, there is a known ink composition including a polymerizable compound, a polymerization inhibitor, a photopolymerization initiator, and a surface tension control agent. This ink composition is an ink composition for forming a clear layer in which the polymerization inhibitor includes at least one compound selected from the group consisting of hindered amine compounds, nitrosamine compounds, and quinone compounds, and the photopolymerization initiator includes at least one compound selected from the group consisting of acylphosphine oxide compounds, α-aminoalkylphenone compounds, and thioxanthone compounds (refer to JP2011-57744A, for example).

SUMMARY OF THE INVENTION

Actinic-ray-curable ink compositions desirably have a capability of forming films (for example, images) having high blocking resistance and high stretchability. In particular, when actinic-ray-curable ink compositions are used for printing of, for example, outdoor advertisements and hanging banners, the produced printed matters are usually rolled up. Thus, actinic-ray-curable ink compositions desirably have a capability of forming films having both of high blocking resistance and high stretchability.

However, there is a tradeoff relationship between the blocking resistance and the stretchability, and it has been difficult to achieve both of these.

Actinic-ray-curable ink compositions desirably have another capability of forming films having high glossiness. In particular, in the case of ink compositions not including coloring agents (what are called, clear inks), they are also used to play the role of varnish, and hence glossiness is an important property.

An object of an embodiment of the present invention is to provide an actinic-ray-curable ink composition that has a capability of forming a film having high glossiness, high blocking resistance, and high stretchability.

An object of another embodiment of the present invention is to provide an ink jet recording method using the actinic-ray-curable ink composition.

Specific means for achieving the objects includes the following aspects.

<1> An actinic-ray-curable ink composition including: a di(meth)acrylate having a linear alkylene group; a di(meth)acrylate having an alkylene oxide chain; a cyclohexyl-dienone-based polymerization inhibitor that includes at least one selected from the group consisting of a compound represented by Formula (1) below and a compound represented by Formula (2) below; and a photopolymerization initiator.

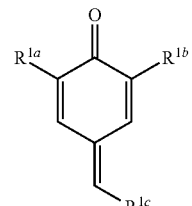

(1)

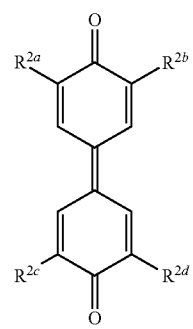

(2)

In Formula (1), $R^{1a}$ and $R^{1b}$ each independently represent an alkyl group having 1 to 8 carbon atoms, $R^{1c}$ represents a phenyl group or a cyclohexyl group.

In Formula (2), $R^{2a}$, $R^{2b}$, $R^{2c}$, and $R^{2d}$ each independently represent an alkyl group having 1 to 8 carbon atoms.

<2> The actinic-ray-curable ink composition according to <1>, wherein, in the di(meth)acrylate having a linear alkylene group, the alkylene group has 10 or more carbon atoms.

<3> The actinic-ray-curable ink composition according to <1> or <2>, wherein, in the di(meth)acrylate having an alkylene oxide chain, the alkylene oxide chain has 3 or more repeating units.

<4> The actinic-ray-curable ink composition according to any one of <1> to <3>, wherein the cyclohexyldienone-based polymerization inhibitor includes the compound represented by Formula (1), in which at least one of $R^{1a}$ or $R^{1b}$ is a t-butyl group.

<5> The actinic-ray-curable ink composition according to any one of <1> to <4>, wherein a content ratio of the di(meth)acrylate having a linear alkylene group relative to a total mass of the actinic-ray-curable ink composition is from 40 mass % to 75 mass %.

<6> The actinic-ray-curable ink composition according to any one of <1> to <5>, wherein a content ratio of the di(meth)acrylate having an alkylene oxide chain relative to a total mass of the actinic-ray-curable ink composition is from 15 mass % to 50 mass %.

<7> The actinic-ray-curable ink composition according to any one of <1> to <6>, wherein a content ratio of the cyclohexyldienone-based polymerization inhibitor relative to a total mass of the actinic-ray-curable ink composition is from 0.08 mass % to 2 mass %.

<8> The actinic-ray-curable ink composition according to any one of <1> to <7>, further including a surfactant having a polymerizable group.

<9> The actinic-ray-curable ink composition according to <8>, wherein the surfactant having a polymerizable group includes a silicone-based surfactant.

<10> The actinic-ray-curable ink composition according to <8> or <9>, wherein a content ratio of the surfactant having a polymerizable group relative to a total mass of the actinic-ray-curable ink composition is from 0.5 mass % to 10 mass %.

<11> The actinic-ray-curable ink composition according to any one of <1> to <10>, wherein, on a mass basis, a ratio of a content of the di(meth)acrylate having a linear alkylene group to a content of the cyclohexyldienone-based polymerization inhibitor from is 20 to 3000.

<12> The actinic-ray-curable ink composition according to any one of <1> to <11>, wherein, on a mass basis, a ratio of a content of the di(meth)acrylate having a linear alkylene group to a content of the di(meth)acrylate having an alkylene oxide chain is from 0.8 to 9.5.

<13> The actinic-ray-curable ink composition according to any one of <1> to <12>, wherein a total content ratio of the di(meth)acrylate having a linear alkylene group and the di(meth)acrylate having an alkylene oxide chain relative to a total mass of the actinic-ray-curable ink composition is from 55 mass % to 95 mass %.

<14> The actinic-ray-curable ink composition according to any one of <1> to <13>, wherein a coloring agent is not included.

<15> An ink jet recording method including: ejecting, onto a recording medium, the actinic-ray-curable ink composition according to any one of <1> to <14> by an ink jet method; and irradiating the ejected actinic-ray-curable ink composition with an actinic ray to cure the actinic-ray-curable ink composition.

An embodiment of the present invention provides an actinic-ray-curable ink composition that has a capability of forming a film having high glossiness, high blocking resistance, and high stretchability.

Another embodiment of the present invention provides an ink jet recording method using the actinic-ray-curable ink composition.

DESCRIPTION OF THE PREFERRED EMBODIMENTS

Hereinafter, an actinic-ray-curable ink composition and an ink jet recording method according to the present disclosure will be described. However, the present invention is not limited to the following embodiments at all, and the embodiments can be appropriately modified and practiced within the scope of objects of the present invention.

In the present disclosure, ranges defined by a value "to" a value include these values as the minimum value and the maximum value.

In the present disclosure, among ranges described in series, the upper limit value or the lower limit value of a range may be replaced by the upper limit value or the lower limit value of one of other ranges described in series. In ranges described in the present disclosure, the upper limit value or the lower limit value of a range may be replaced by a value described in Examples.

In the present disclosure, the concentration or content ratio of each component means, when a plurality of substances belonging to the component are present, the total concentration or content ratio of the plurality of substances, unless otherwise specified.

In the present disclosure, the term "step" includes not only an independent step, but also a step that is not clearly distinguished from another step but that achieves the intended result of the step.

In the present disclosure, "(meth)acrylate" is a concept that encompasses both of acrylate and methacrylate.

In the present disclosure, ultraviolet radiation is also referred to as "UV (Ultra Violet) light".

Actinic-Ray-Curable Ink Composition

The actinic-ray-curable ink composition according to the present disclosure (hereafter, also simply referred to as the "ink composition") includes a di(meth)acrylate having a linear alkylene group (hereafter, also referred to as the "component A"), a di(meth)acrylate having an alkylene oxide chain (hereafter, also referred to as the "component B"), a cyclohexyldienone-based polymerization inhibitor (hereafter, also referred to as the "component C") that includes at least one selected from the group consisting of the compound represented by Formula (1) and the compound represented by Formula (2), and a photopolymerization initiator (hereafter, also referred to as the "component D").

The ink composition according to the present disclosure has a capability of forming a film having high glossiness, high blocking resistance, and high stretchability.

The reason why the ink composition according to the present disclosure provides such advantages has not been clarified; however, the inventor of the present invention infers the reason as follows.

In existing films formed from actinic-ray-curable ink compositions, there is a tradeoff relationship between the blocking resistance and the stretchability, and it has been difficult to achieve both of these. In particular, films formed from ink compositions not including coloring agents (what are called, clear inks) tend to have lower blocking resistance than films formed from ink compositions including coloring agents (what are called, color inks). The blocking resistance can be improved by, for example, adding a polyfunctional monomer having high glass transition temperature (Tg); however, this causes an increase in the crosslinking density, which may cause problems of degradation of the stretchability and adhesion of the films.

By contrast, the ink composition according to the present disclosure includes a di(meth)acrylate having a linear alkylene group (component A), a di(meth)acrylate having an alkylene oxide chain (component B), a cyclohexyldienone-based polymerization inhibitor (component C), and a photopolymerization initiator (component D), to thereby have a capability of forming a film that has both of blocking resistance and stretchability, which have been difficult to achieve, and that also has glossiness.

In the ink composition according to the present disclosure, the combination of the component A and the component B probably contributes to both of blocking resistance and stretchability of the film. In the ink composition according to the present disclosure, the component A and the component C probably contribute to glossiness of the film. For improvement in the glossiness, the wettability of the ink composition is important. The probable reason why the component A contributes to improvement in the glossiness of the film is that the component A included causes a decrease in the surface tension of the ink composition, which results in improvement in the wettability for a recording medium. The probable reason why the component C contributes to improvement in the glossiness of the film is that the component C included suppresses curing of the ink composition due to leakage light during irradiation with an actinic ray (such as UV light), so that the ink composition spreads over the recording medium.

In contrast to the ink composition according to the present disclosure, the actinic-energy-ray-curable ink jet ink composition described in JP2012-193275A (hereafter, Patent Literature 1) does not include the component C according to the present disclosure. Thus, the film formed from the actinic-energy-ray-curable ink jet ink composition described in Patent Literature 1 inferentially has lower glossiness than the film formed from the ink composition according to the present disclosure. In addition, Patent Literature 1 does not describe formation of a film having both of blocking resistance and stretchability from the actinic-energy-ray-curable ink jet ink composition, and does not even pay attention to formation of such a film also having glossiness.

A clear-layer-formable ink composition described in JP2011-57744A (hereafter, Patent Literature 2) includes a polymerizable compound, a polymerization inhibitor belonging to the component C according to the present disclosure, and a photopolymerization initiator; however, Patent Literature 2 does not state that the combination of the component A, the component B, the component C, and the component D according to the present disclosure enables formation of a film having both of blocking resistance and stretchability, or enables formation of such a film also having glossiness.

The ink composition according to the present disclosure has a capability of forming a film having high adhesion to a recording medium.

The ink composition according to the present disclosure includes the component A, which causes a decrease in the surface tension, to provide improved wettability for a recording medium. This probably results in formation of a film having improved adhesion to a recording medium.

The ink composition according to the present disclosure also has high temporal stability.

The ink composition according to the present disclosure includes the component C, which provides improved thermal stability, probably resulting in improved temporal stability.

Incidentally, the above-described inferences do not limit advantages of the present invention, but explain mere examples of the advantages.

Hereinafter, components in the actinic-ray-curable ink composition according to the present disclosure will be described in detail.

Di(meth)acrylate Having Linear Alkylene Group: Component A

The ink composition according to the present disclosure includes a di(meth)acrylate having a linear alkylene group.

Incidentally, the "di(meth)acrylate having a linear alkylene group" according to the present disclosure does not include a "di(meth)acrylate having an alkylene oxide chain" or a "surfactant having a polymerizable group" described later.

In the ink composition according to the present disclosure, the di(meth)acrylate having a linear alkylene group contributes to improvement in the glossiness, blocking resistance, and stretchability of the film to be formed. The di(meth)acrylate having a linear alkylene group also contributes to improvement in the adhesion (to a recording medium) of the film to be formed.

The alkylene group is not particularly limited as long as it has a linear structure. The linear alkylene group may have a substituent or may be unsubstituted, and is preferably unsubstituted.

The number of carbon atoms of the alkylene group in the di(meth)acrylate having a linear alkylene group is, from the viewpoint of further improvement in the glossiness and stretchability of the film to be formed, preferably 6 or more, more preferably 9 or more, still more preferably 10 or more.

The upper limit of the number of carbon atoms of the alkylene group is not particularly limited; for example, from the viewpoint of handling properties, the number is preferably 18 or less.

Examples of the di(meth)acrylate having a linear alkylene group include 1,6-hexanediol di(meth)acrylate, 1,9-nonanediol di(meth)acrylate, 1,10-decanediol di(meth)acrylate, and 1,12-dodecanediol di(meth)acrylate.

The di(meth)acrylate having a linear alkylene group may be a commercially available product.

Examples of the commercially available product of the di(meth)acrylate having a linear alkylene group include SR238 (trade name, 1,6-hexanediol diacrylate, the number of carbon atoms of alkylene group: 6, Sartomer), A-NOD-N (trade name, 1,9-nonanediol diacrylate, the number of carbon atoms of alkylene group: 9, Shin Nakamura Chemical Co., Ltd.), and SR595 (trade name, 1,10-decanediol diacrylate, the number of carbon atoms of alkylene group: 10, Sartomer).

The ink composition according to the present disclosure may include, as the di(meth)acrylate having a linear alkylene group, one kind alone or two or more kinds.

The content ratio of the di(meth)acrylate having a linear alkylene group in the ink composition according to the present disclosure is not particularly limited; for example, the content ratio relative to the total mass of the ink composition is preferably from 10 mass % to 90 mass %, more preferably from 40 mass % to 75 mass %, still more preferably from 50 mass % to 70 mass %.

When the content ratio of the di(meth)acrylate having a linear alkylene group in the ink composition according to the present disclosure satisfies such a range, the film to be formed can have further improved glossiness, blocking resistance, and stretchability. In addition, the film to be formed can have further improved adhesion to a recording medium.

In particular, when the ink composition according to the present disclosure includes 40 mass % or more of the di(meth)acrylate having a linear alkylene group, the system becomes hydrophobic, which probably results in an increase in the amount of dissolved oxygen in the ink composition. The dissolved oxygen in the increased amount also plays the role of a polymerization inhibitor to suppress curing due to leakage light during irradiation with an actinic ray (such as UV light), so that the ink composition spreads over a recording medium. This probably results in formation of the film having further improved glossiness.

In the ink composition according to the present disclosure, on a mass basis, the ratio of the content of the di(meth)acrylate having a linear alkylene group to the content of a cyclohexyldienone-based polymerization inhibitor described later is preferably from 20 to 3000, more preferably from 30 to 1000, still more preferably from 40 to 700.

When, on a mass basis, the ratio of the content of the di(meth)acrylate having a linear alkylene group to the content of the cyclohexyldienone-based polymerization inhibitor described later satisfies such a range, the ink composition can be provided to have a capability of forming a film having higher glossiness.

In the ink composition according to the present disclosure, on a mass basis, the ratio of the content of the di(meth)acrylate having a linear alkylene group to the content of a di(meth)acrylate having an alkylene oxide chain described later is preferably from 0.8 to 9.5, more preferably from 0.8 to 4.0, still more preferably from 1.2 to 3.0.

When, on a mass basis, the ratio of the content of the di(meth)acrylate having a linear alkylene group to the content of the di(meth)acrylate having an alkylene oxide chain described later satisfies such a range, the ink composition can be provided to have a capability of forming a film that is more highly balanced in terms of blocking resistance and stretchability.

When the ink composition according to the present disclosure further includes a surfactant having a polymerizable group described later, on a mass basis, the ratio of the content of the di(meth)acrylate having a linear alkylene group to the content of the surfactant having a polymerizable group is preferably from 5 to 1000, more preferably from 10 to 200, still more preferably from 13 to 100.

When, on a mass basis, the ratio of the content of the di(meth)acrylate having a linear alkylene group to the content of the surfactant having a polymerizable group described later satisfies such a range, the ink composition can be provided to have a capability of forming a film that is more highly balanced in terms of glossiness and blocking resistance.

Di(meth)acrylate Having Alkylene Oxide Chain: Component B

The ink composition according to the present disclosure includes a di(meth)acrylate having an alkylene oxide chain.

In the ink composition according to the present disclosure, the di(meth)acrylate having an alkylene oxide chain contributes to improvement in the blocking resistance and stretchability of the film to be formed.

The alkylene oxide chain may be an ethylene oxide chain, or a propylene oxide chain, or a butylene oxide chain.

For example, from the viewpoint of glossiness, the alkylene oxide chain is preferably an ethylene oxide chain.

In the di(meth)acrylate having an alkylene oxide chain, the number of repeating units of the alkylene oxide chain is preferably 3 or more, more preferably 4 or more, still more preferably 9 or more.

In the di(meth)acrylate having an alkylene oxide chain, when the number of repeating units of the alkylene oxide chain is 3 or more, the film to be formed can have further improved blocking resistance and stretchability.

In the di(meth)acrylate having an alkylene oxide chain, the upper limit of the number of repeating units of the alkylene oxide chain is not particularly limited; for example, from the viewpoint of glossiness and blocking resistance, the number is preferably 15 or less.

In the present disclosure, the "number of repeating units" of the alkylene oxide chain means the "average number of moles added" of the alkylene oxide chain.

The di(meth)acrylate having an alkylene oxide chain may have an alkylene group.

The alkylene group is not particularly limited, and may be, for example, a linear alkylene group having 2 to 3 carbon atoms.

Examples of the di(meth)acrylate having an alkylene oxide chain include triethylene glycol di(meth)acrylate, tetraethylene glycol di(meth)acrylate, polyethylene glycol (200) di(meth)acrylate, polyethylene glycol (400) di(meth)acrylate, polyethylene glycol (600) di(meth)acrylate, polyethylene glycol (1000) di(meth)acrylate, dipropylene glycol di(meth)acrylate, tripropylene glycol di(meth)acrylate, polypropylene glycol (400) di(meth)acrylate, and polypropylene glycol (700) di(meth)acrylate.

The di(meth)acrylate having an alkylene oxide chain may be a commercially available product.

Examples of the commercially available product of the di(meth)acrylate having an alkylene oxide chain include SR230 (trade name, diethylene glycol diacrylate, the number (n) of repeating units of alkylene oxide chain: 2, Sartomer), SR272 (trade name, triethylene glycol diacrylate, the number (n) of repeating units of alkylene oxide chain: 3, Sartomer), SR344 (trade name, polyethylene glycol (400) diacrylate, the number (n) of repeating units of alkylene oxide chain: 9, Sartomer), SR610 (trade name, polyethylene glycol (600) diacrylate, the number (n) of repeating units of alkylene oxide chain: 13, Sartomer), and SR508 (trade name, dipropylene glycol diacrylate, the number of repeating units of alkylene oxide chain: 2, Sartomer).

The ink composition according to the present disclosure may include, as the di(meth)acrylate having an alkylene oxide chain, one kind alone or two or more kinds.

In the ink composition according to the present disclosure, the content ratio of the di(meth)acrylate having an alkylene oxide chain is not particularly limited; for example, the content ratio relative to the total mass of the ink composition is preferably from 5 mass % to 70 mass %, more preferably from 10 mass % to 50 mass %, still more preferably from 16 mass % to 45 mass %.

In the ink composition according to the present disclosure, when the content ratio of the di(meth)acrylate having an alkylene oxide chain satisfies such a range, a film having higher glossiness, blocking resistance, and stretchability can be formed.

In the ink composition according to the present disclosure, the total content ratio of the di(meth)acrylate having a linear alkylene group and the above-described di(meth)acrylate having an alkylene oxide chain is, for example, relative to the total mass of the ink composition, preferably from 55 mass % to 95 mass %, more preferably from 60 mass % to 95 mass %, still more preferably from 85 mass % to 95 mass %.

In the ink composition according to the present disclosure, when the total content ratio of the di(meth)acrylate having a linear alkylene group and the above-described di(meth)acrylate having an alkylene oxide chain satisfies such a range, a film having higher glossiness, blocking resistance, and stretchability can be formed.

Cyclohexyldienone-Based Polymerization Inhibitor: Component C

The ink composition according to the present disclosure includes a cyclohexyldienone-based polymerization inhibitor (hereafter, also simply referred to as the "cyclohexyldienone-based polymerization inhibitor") that includes at least one selected from the group consisting of a compound represented by Formula (1) below and a compound represented by Formula (2) below.

In the ink composition according to the present disclosure, the cyclohexyldienone-based polymerization inhibitor contributes to improvement in the glossiness of the film to be formed. The cyclohexyldienone-based polymerization inhibitor also contributes to the temporal stability of the ink composition.

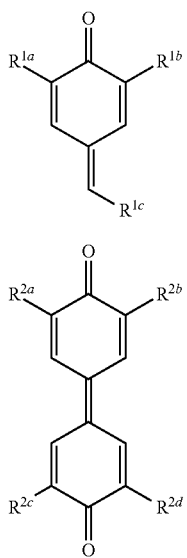

In Formula (1), $R^{1a}$ and $R^{1b}$ each independently represent an alkyl group having 1 to 8 carbon atoms, preferably an alkyl group having 1 to 6 carbon atoms, more preferably an alkyl group having 1 to 4 carbon atoms.

Examples of the alkyl group having 1 to 8 carbon atoms include linear, branched, or cyclic alkyl groups such as a methyl group, an ethyl group, an n-propyl group, an iso-propyl group, an n-butyl group, an iso-butyl group, a sec-butyl group, a t-butyl group, an n-pentyl group, an n-hexyl group, a cyclohexyl group, an n-heptyl group, an n-octyl group, and a 2-ethylhexyl group.

In Formula (1), from the viewpoint of further improvement in the glossiness of the film to be formed, at least one of $R^{1a}$ or $R^{1b}$ is preferably a t-butyl group, more preferably both of them are t-butyl groups.

In Formula (1), $R^{1c}$ represents a phenyl group or a cyclohexyl group, preferably a phenyl group.

In Formula (2), $R^{2a}$, $R^{2b}$, $R^{2c}$, and $R^{2d}$ each independently represent an alkyl group having 1 to 8 carbon atoms, preferably an alkyl group having 1 to 6 carbon atoms, more preferably an alkyl group having 1 to 4 carbon atoms.

Specific examples of the alkyl group having 1 to 8 carbon atoms are the same as above.

In Formula (2), from the viewpoint of further improvement in the temporal stability of the ink composition, among $R^{2a}$, $R^{2b}$, $R^{2c}$, and $R^{2d}$, at least two are preferably methyl groups or t-butyl groups, more preferably at least two are t-butyl groups.

More preferably, the ink composition according to the present disclosure includes, as the cyclohexyldienone-based polymerization inhibitor, the compound represented by Formula (1), in which at least one of $R^{1a}$ or $R^{1b}$ is a t-butyl group.

Particularly preferably, the ink composition according to the present disclosure includes, as the cyclohexyldienone-based polymerization inhibitor, the compound represented by Formula (1), in which both of $R^{1a}$ and $R^{1b}$ are t-butyl groups, and $R^{1c}$ is a phenyl group.

The cyclohexyldienone-based polymerization inhibitor may be a commercially available product.

Examples of the commercially available product of the cyclohexyldienone-based polymerization inhibitor include IRGASTAB (registered trademark) UV22 (trade name, BASF), 3,3',5,5'-TETRAMETHYLDIPHENOQUINONE (abbreviation: TMDPQ, Sigma-Aldrich Corporation), 3,3'-DI-TERT-BUTYL-5,5'-DIMETHYLDIPHENOQUINONE (abbreviation: DBDMDPQ, Sigma-Aldrich Corporation), and 3,3',5,5'-TETRA-TERT-BUTYLDIPHENOQUINONE (abbreviation: TBDPQ, Sigma-Aldrich Corporation).

The ink composition according to the present disclosure may include, as the cyclohexyldienone-based polymerization inhibitor, one kind alone or two or more kinds.

In the ink composition according to the present disclosure, the content ratio of the cyclohexyldienone-based polymerization inhibitor is not particularly limited, and is, for example, relative to the total mass of the ink composition, preferably from 0.03 mass % to 3 mass %, more preferably from 0.08 mass % to 2 mass %, still more preferably from 0.1 mass % to 1.5 mass %.

In the ink composition according to the present disclosure, when the content ratio of the cyclohexyldienone-based polymerization inhibitor satisfies such a range, further improvement can be achieved in the glossiness of the film to be formed.

Photopolymerization Initiator: Component D

The ink composition according to the present disclosure includes a photopolymerization initiator.

The photopolymerization initiator is not particularly limited, and can be appropriately selected from publicly known photopolymerization initiators.

The photopolymerization initiator is a compound that absorbs light (namely, an actinic ray) to generate a radical serving as a polymerization initiation species.

Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include a-thiobenzophenone compounds described in JP1972-6416B (JP-S47-6416B), benzoin ether compounds described in JP1972-3981B (JP-547-3981B), a-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-560-26483B), benzoin ethers described in JP1985-26403B (JP-560-26403B) and JP1987-81345A (JP-562-81345A), a-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-S61-194062A), acylphosphine sulfide described in JP1990-9597B (JP-H2-

9597B), acylphosphine described in JP1990-9596B (JP-H2-9596B), thioxanthones described in JP1988-61950B (JP-S63-61950B), coumarins described in JP1984-42864B (JP-S59-42864B), and compounds described in WO2015/158745A.

Also preferred are photopolymerization initiators described in JP2008-105379A and JP2009-114290A.

The photopolymerization initiator may be a commercially available product.

Examples of the commercially available product of the photopolymerization initiator include IRGACURE (registered trademark) 184, 369, 500, 651, 819, 907, 1000, 1300, 1700, 1870, DAROCUR (registered trademark) 1173, 2959, 4265, ITX, TPO [all from BASF], ESACURE (registered trademark) KT037, KT046, KIP150, EDB [all from Lamberti S.p.A.], H-Nu (registered trademark) 470, 470X [all from Spectra Group Limited], Omnipol TX, 9210 [all from IGM Resins B.V.], and Genopol AB-2 [from Rahn AG].

Among these, the photopolymerization initiator is, from the viewpoint of sensitivity to UV light, more preferably at least one selected from the group consisting of (a) carbonyl compounds and (b) acylphosphine oxide compounds; from the viewpoint of improvement in the sensitivity and suitability for LED light, more preferred are (b) acylphosphine oxide compounds, particularly preferred are monoacylphosphine oxide compounds.

Such a monoacylphosphine oxide compound is preferably at least one selected from the group consisting of bis(2,4,6-trimethylbenzoyl)-phenylphosphine oxide [for example, IRGACURE (registered trademark) 819 from BASF], and 2,4,6-trimethylbenzoyldiphenylphosphine oxide [for example, DAROCUR (registered trademark) TPO from BASF].

The ink composition according to the present disclosure may include, as the photopolymerization initiator, one kind alone or two or more kinds.

In the ink composition according to the present disclosure, the content ratio of the photopolymerization initiator is not particularly limited, and is, for example, relative to the total mass of the ink composition, preferably from 1 mass % to 12 mass %, more preferably from 2 mass % to 10 mass %, still more preferably from 4 mass % to 8 mass %.

In the ink composition according to the present disclosure, when the content ratio of the photopolymerization initiator satisfies such a range, a film having higher blocking resistance and stretchability can be formed.

Surfactant Having Polymerizable Group: Component E

The ink composition according to the present disclosure preferably further includes a surfactant having a polymerizable group.

In an embodiment in which the ink composition according to the present disclosure further includes a surfactant having a polymerizable group, further improvement can be achieved in the blocking resistance and glossiness of the film to be formed.

The polymerizable group is preferably a photopolymerizable group.

The photopolymerizable group is preferably a radical polymerization group, more preferably a group including an ethylenically double bond, still more preferably a group including at least one of a vinyl group or a 1-methylvinyl group. The radical polymerization group is, from the viewpoint of radical polymerization reactivity and hardness of the film to be formed, particularly preferably a (meth)acryloyl group.

The surfactant having a polymerizable group is not particularly limited, and can be appropriately selected from publicly known surfactants having a polymerizable group.

The surfactant having a polymerizable group includes, for example, from the viewpoint of further improvement in blocking resistance and glossiness of the film to be formed, preferably at least one selected from the group consisting of a surfactant having a silicone chain (namely, a silicone-based surfactant) and a surfactant having a perfluoroalkyl chain (namely, fluorosurfactant); more preferably, from the viewpoint of further improvement in blocking resistance of the film to be formed, a silicone-based surfactant.

The surfactant having a polymerizable group may be a commercially available product.

Examples of the commercially available product of the silicone-based surfactant having a polymerizable group include TEGO (registered trademark) Rad 2010, 2011, 2100, 2200N, 2250N, 2300, 2500, 2600, 2700 (all from EVONIK), BYK-UV3500, 3505, 3510, 3530, 3550, 3570, and BYK-SILCLEAN 3700 (all from BYK Chemie GmbH).

Examples of the commercially available product of the fluorosurfactant having a polymerizable group include MEGAFACE (registered trademark) RS-76-NS, MEGAFACE (registered trademark) RS75, and RS90 (all from DIC Corporation).

When the ink composition according to the present disclosure includes a surfactant having a polymerizable group, it may include, as the surfactant having a polymerizable group, one kind alone or two or more kinds.

When the ink composition according to the present disclosure includes the surfactant having a polymerizable group, the content ratio of the surfactant having a polymerizable group in the ink composition is not particularly limited, and is, for example, relative to the total mass of the ink composition, preferably from 0.05 mass % to 10 mass %, more preferably from 0.5 mass % to 10 mass %, still more preferably from 0.5 mass % to 5 mass %, particularly preferably from 1 mass % to 4 mass %.

In the ink composition according to the present disclosure, when the content ratio of the surfactant having a polymerizable group satisfies such a range, further improvement can be achieved in the blocking resistance and glossiness of the film to be formed.

Coloring Agent

The ink composition according to the present disclosure may include a coloring agent.

When the ink composition according to the present disclosure includes a coloring agent, the coloring agent is not particularly limited, and may be appropriately selected from publicly known coloring agents such as pigments, water-soluble dyes, and disperse dyes.

Among these, as the coloring agent, from the viewpoint of high weather resistance and high color reproducibility, more preferred are pigments.

The pigments are not particularly limited, and can be appropriately selected in accordance with the purpose.

Examples of the pigments include publicly known organic pigments and inorganic pigments.

Examples of the organic pigments and inorganic pigments include yellow pigments, magenta pigments, cyan pigments, red pigments, blue pigments, green pigments, orange pigments, violet pigments, brown pigments, black pigments, and white pigments.

Other examples of the pigments include surface-treated pigments [such as pigments in which pigment surfaces are treated with, for example, a dispersing agent such as a resin or a pigment derivative, and self-dispersible pigments in which particle surfaces have a hydrophilic group (for example, an anionic group such as a carboxy group, a phosphoric acid group, or a sulfonic acid group)]. Other examples of the pigments include commercially available pigment dispersions.

When pigments are used as the coloring agent, during preparation of pigment particles, a dispersing agent for dispersing the pigments (namely, a pigment dispersing agent) may be optionally used.

For the coloring agents such as pigments and the pigment dispersing agent, reference may be appropriately made to Paragraphs [0180] to [0200] of JP2014-040529A.

A dispersion medium used for dispersing the pigment in the ink composition is not particularly limited, and can be appropriately selected in accordance with the purpose.

For example, a polymerizable compound (such as the above-described di(meth)acrylate having a linear alkylene group) may be used as the dispersion medium, or a solvent may be used as the dispersion medium. However, the ink composition according to the present disclosure is an actinic-ray-curable ink composition; for example, the ink composition is applied to a recording medium and then cured, and hence the composition is preferably solventless composition not including solvents. This is because, when the cured product provided by curing includes residual solvent, it may have lower solvent resistance or the residual solvent may cause the VOC (Volatile Organic Compound) problem. For example, preferred is use of, as the dispersion medium, the above-described di(meth)acrylate having a linear alkylene group) from the viewpoint of dispersion suitability.

When the ink composition according to the present disclosure includes a coloring agent, it may include, as a surfactant having a polymerizable group, one kind alone or two or more kinds.

When the ink composition according to the present disclosure includes a coloring agent, the content ratio of the coloring agent in the ink composition is appropriately selected in accordance with the color and the purpose of usage, and is, for example, relative to the total mass of the ink composition, preferably from 1 mass % to 20 mass %.

The ink composition according to the present disclosure may include a coloring agent, but preferably does not include a coloring agent, namely, is a clear ink.

The phrase "not include a coloring agent" means that coloring agents are substantially not included: specifically, the content ratio of a coloring agent in the ink composition according to the present disclosure is 0.1 mass % or less.

Films formed from clear inks tend to have lower blocking resistance than films formed from ink compositions including coloring agents (namely, color inks). The blocking resistance is improved by, for example, a known method of using a polyfunctional monomer having high glass transition temperature (Tg). However, use of such a polyfunctional monomer having high glass transition temperature (Tg) causes an increase in the crosslinking density, which results in problems of lower stretchability and adhesion. In addition, clear inks are also used to play the role of varnish, and hence desirably exhibit higher glossiness than color inks.

When the ink composition according to the present disclosure does not include a coloring agent, it has a capability of forming a film having high glossiness, high blocking resistance, and high stretchability, and has a capability of forming such a film further having high adhesion to a recording medium.

Other Monomer

The ink composition according to the present disclosure may include, in addition to the above-described di(meth)acrylate having a linear alkylene group and di(meth)acrylate having an alkylene oxide chain, a polymerizable monomer (hereafter, also referred to as the "other monomer").

Examples of the other monomer include monomers having an ethylenically polymerizable group. Examples of the polymerizable group include a (meth)acryloyl group, an allyl group, a styryl group, and a vinyl group.

The other monomer may be a monofunctional monomer or a polyfunctional monomer.

Examples of the other monomer include commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical-polymerizable monomers and crosslinkable monomers publicly known in the industry.

The content ratio of the other monomer in the ink composition according to the present disclosure is, for example, relative to the total mass of the ink composition, preferably 80 mass % or less, more preferably 50 mass % or less, still more preferably 15 mass % or less, particularly preferably 0 mass %, that is, the other monomer is not included.

Solvent

The ink composition according to the present disclosure may include a solvent.

Examples of the solvent include ketone-based solvents such as acetone, methyl ethyl ketone, and diethyl ketone; alcohol-based solvents such as methanol, ethanol, 2-propanol, 1-propanol, 1-butanol, and tert-butanol; chlorinated solvents such as chloroform and methylene chloride; aromatic solvents such as benzene and toluene; ester-based solvents such as ethyl acetate, butyl acetate, and isopropyl acetate; ether-based solvents such as diethyl ether, tetrahydrofuran, and dioxane; glycol ether-based solvents such as ethylene glycol monomethyl ether, ethylene glycol dimethyl ether, and tripropylene glycol monomethyl ether; cyclic ester-based solvents such as γ-butyrolactone; and amide-based solvents such as 2-methylpyrrolidone and 2-pyrrolidone.

The content ratio of the solvent in the ink composition according to the present disclosure is preferably in such a range that does not cause problems of solvent resistance and VOC; the content ratio is, for example, relative to the total mass of the ink composition, preferably 1 mass % or less, more preferably 0.5 mass % or less, still more preferably 0.3 mass % or less, particularly preferably 0 mass % (namely, solventless).

Other Additives

The ink composition according to the present disclosure may include, in addition to the above-described components, other components (what are called, other additives) as needed.

The other additives can be appropriately selected form publicly known additives.

Examples of the other additives include ultraviolet absorbents, leveling agents, matting agents, waxes, viscosity control agents, and antioxidants.

Application of Ink Composition

The ink composition according to the present disclosure is suitably usable as an ink composition for ink jet recording.

The ink composition according to the present disclosure has a capability of forming a film having high glossiness, high blocking resistance, and high stretchability; thus, it is particularly suitably applied to formation of films having these characteristics, that is, formation of images on wide-format roll substrates used for recording media for outdoor advertisements and hanging banners, for example.

Ink Jet Recording Method

The ink composition according to the present disclosure is suitably usable as an ink composition for ink jet.

The ink jet recording method using the ink composition according to the present disclosure is not particularly limited.

The ink jet recording method according to the present disclosure preferably includes a step of ejecting, onto a recording medium, the ink composition according to the present disclosure by an ink jet method (hereafter, also referred to as the "ejection step"), and a step of irradiating the ejected ink composition with an actinic ray to cure the ink composition (hereafter, also referred to as the "curing step").

The ink jet recording method according to the present disclosure includes the ejection step and the curing step, so that, on a recording medium, the cured ink composition form a film (such as an image) having high glossiness, high blocking resistance, and high stretchability.

Hereinafter, steps of the ink jet recording method according to the present disclosure will be described in detail.

Ejection Step

The ejection step is a step of ejecting, onto a recording medium, the ink composition according to the present disclosure by an ink jet method.

The recording medium is not particularly limited, and can be a publicly known recording medium.

Examples of the recording medium include paper, paper laminated with plastic (such as polyethylene, polypropylene, or polystyrene), metal plates (plates of metals such as aluminum, zinc, or copper), plastic films (films formed of polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, or acrylic resin), paper laminated with or vapor-deposition-coated with the foregoing metals, and plastic films laminated with or vapor-deposition-coated with the foregoing metals.

The ink composition according to the present disclosure includes the di(meth)acrylate having a linear alkylene group and having high affinity for polyvinyl chloride films, so that, in the case of using polyvinyl chloride films as recording media, marked improvement in adhesion can be achieved.

The ejection of the ink composition onto a recording medium by an ink jet method can be performed with a publicly known ink jet recording apparatus.

The ink jet recording apparatus is not particularly limited, and a publicly known ink jet recording apparatus that provides a target resolution can be appropriately selected. Specifically, any such publicly known ink jet recording apparatuses including commercially available products can be used for the ink jet recording method according to the present disclosure.

Such an ink jet recording apparatus that can be used for the ink jet recording method according to the present disclosure is, for example, an apparatus including an ink supply device, a temperature sensor, an actinic-energy-ray source, and the like.

The ink supply device includes, for example, a source tank including the ink composition according to the present disclosure, supply pipes, an ink supply tank disposed immediately upstream of an ink jet head, a filter, and a piezo ink jet head. The piezo ink jet head may be operated so as to eject multisize dots of preferably from 1 pl (picoliter) to 100 pl, more preferably from 8 pl to 30 pl, at a resolution of preferably from 320 dpi (dot per inch)×320 dpi to 4000 dpi×4000 dpi, more preferably from 400 dpi×400 dpi to 1600 dpi×1600 dpi, still more preferably from 720 dpi×720 dpi.

Incidentally, "dpi (dot per inch)" in the present disclosure represents the number of dots for 2.54 cm (that is, 1 inch).

Curing Step

The curing step is a step of irradiating the ejected ink composition with an actinic ray to cure the ink composition.

In the curing step, the ink composition ejected on a recording medium is cured by irradiation with an actinic ray. The photopolymerization initiator (namely, the component D) included in the ink composition according to the present disclosure is decomposed by irradiation with an actinic ray, to generate a polymerization initiation species such as a radical. The function of the polymerization initiation species causes and accelerates the polymerization reaction of the di(meth)acrylate having a linear alkylene group (namely, the component A) and the di(meth)acrylate having an alkylene oxide chain (namely, the component B) included in the ink composition according to the present disclosure, to thereby cure the ink composition.

Examples of the actinic ray include ultraviolet radiation (UV light), visible light, and electron beams; of these, UV light is preferred.

The actinic ray preferably has a peak wavelength of, for example, from 200 nm to 600 nm, more preferably from 300 nm to 450 nm, still more preferably from 320 nm to 420 nm, particularly preferably from 340 nm to 400 nm.

During the irradiation with an actinic ray, the illuminance at the exposed surface is preferably from 10 mW/cm$^2$ to 2000 mW/cm$^2$, more preferably from 20 mW/cm$^2$ to 1500 mW/cm$^2$.

Examples of the light source of the actinic ray include mercury lamps (such as ultrahigh pressure mercury lamps, high pressure mercury lamps, medium pressure mercury lamps, and low pressure mercury lamps), metal halide lamps, gas lasers, and solid-state lasers. When the actinic ray is ultraviolet radiation, examples of the light source include mercury lamps (such as ultrahigh pressure mercury lamps, high pressure mercury lamps, medium pressure mercury lamps, and low pressure mercury lamps), and metal halide lamps.

Currently, from the viewpoint of environmental preservation, there is a strong demand for mercury-free. Replacement of the above-described examples of light sources by GaN semiconductor ultraviolet-emitting devices is industrially and environmentally highly advantageous. Among semiconductor ultraviolet-emitting devices, LEDs (Light Emitting Diodes) and LDs (Laser Diodes), which are small, have long longevity and high efficiency, and are inexpensive, are expected as photocuring ink jet light sources.

In the ink jet recording method according to the present disclosure, a preferred light source of the actinic ray is an ultraviolet LED (UV-LED).

In the curing step, the time of irradiation with the actinic ray for the ink composition ejected on a recording medium is preferably from 0.01 seconds to 120 seconds, more preferably from 0.1 seconds to 90 seconds.

For irradiation conditions and a basic irradiation method of the actinic ray, reference may be appropriately made to irradiation conditions and irradiation methods disclosed in JP1985-132767A (JP-S60-132767A).

Specifically, the irradiation method of the actinic ray may be a method in which light sources are disposed on both sides of a head unit including an ink ejection device, and the head unit and the light sources are used to perform scanning by, what is called, the shuttle mode to perform irradiation. Another method disclosed in WO99/54415A in which irradiation with an actinic ray is performed with a separated light source not being driven is also usable as a method of irradiation with an actinic ray in the ink jet recording method according to the present disclosure.

The irradiation with an actinic ray is preferably performed after the lapse of a certain time (preferably from 0.01 seconds to 0.5 seconds, more preferably from 0.01 seconds to 0.3 seconds, still more preferably from 0.01 seconds to 0.15 seconds) from landing of the ink composition.

Another Step

The image-forming method according to this embodiment may have, in addition to the above-described ejection step and curing step, another step.

EXAMPLES

Hereinafter, the present invention will be described more specifically with reference to Examples. However, the present invention is not limited to the following Examples unless departing from the spirit and scope thereof.

The following are components used in Examples according to the present invention. Di(meth)acrylate having linear alkylene group: component A SR238 (trade name, 1,6-hexanediol diacrylate, the number of carbon atoms of alkylene group: 6, Sartomer)

A-NOD-N (trade name, 1,9-nonanediol diacrylate, the number of carbon atoms of alkylene group: 9, Shin Nakamura Chemical Co., Ltd.)

SR595 (trade name, 1,10-decanediol diacrylate, the number of carbon atoms of alkylene group: 10, Sartomer)

1,12-Dodecanediol diacrylate synthesized by the following method

Synthesis Method

To 500 g of methylene chloride serving as a solvent, 9.1 g of triethylamine, 0.5 g of 4-dimethylaminopyridine, and 31 g of 2-methyl-6-nitrobenzoic anhydride were dissolved. Subsequently, to the resultant solution, 6.5 g of acrylic acid was added, stirred, then 10.0 g of 1,12-dodecanediol was added, and stirred at room temperature for 48 hours, to obtain 11.5 g of 1,12-dodecanediol diacrylate at a yield of 80%.

Di(meth)acrylate Having Alkylene Oxide Chain: Component B

SR230 (trade name, diethylene glycol diacrylate, the number (n) of repeating units of alkylene oxide chain: 2, Sartomer)

SR272 (trade name, triethylene glycol diacrylate, the number (n) of repeating units of alkylene oxide chain: 3, Sartomer)

SR344 (trade name, polyethylene glycol (400) diacrylate, the number (n) of repeating units of alkylene oxide chain: 9, Sartomer)

SR610 (trade name, polyethylene glycol (600) diacrylate, the number (n) of repeating units of alkylene oxide chain: 13, Sartomer)

SR508 (trade name, dipropylene glycol diacrylate, the number of repeating units of alkylene oxide chain: 2, Sartomer)

The following are the structures of these five di(meth)acrylates having an alkylene oxide chain.

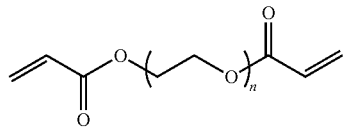

SR230: n = 2
SR272: n = 3
SR344: n = 9
SR610: n = 13

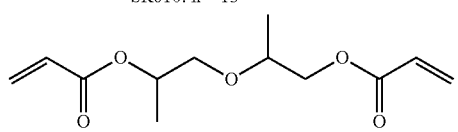

SR508

Cyclohexyldienone-Based Polymerization Inhibitor: Component C

IRGASTAB (registered trademark) UV22 (trade name, BASF)

3,3',5,5'-TETRAMETHYLDIPHENOQUINONE (abbreviation: TMDPQ, Sigma-Aldrich Corporation)

3,3'-DI-TERT-BUTYL-5,5'-DIMETHYLDIPHENOQUINONE (abbreviation: DBDMDPQ, Sigma-Aldrich Corporation)

3,3',5,5'-TETRA-TERT-BUTYLDIPHENOQUINONE (abbreviation: TBDPQ, Sigma-Aldrich Corporation)

The following are the structures of these four cyclohexyldienone-based polymerization inhibitors.

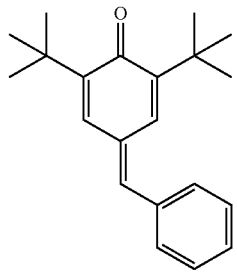

UV22

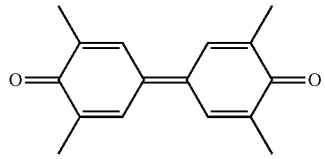

TMDPQ

-continued

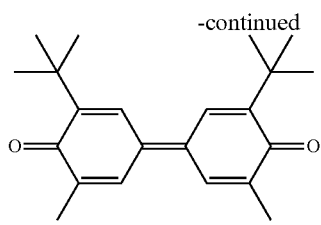

DBDMDPQ

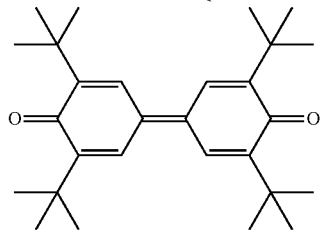

TBDPQ

Photopolymerization Initiator: Component D

DAROCUR (registered trademark) TPO (trade name, 2,4,6-trimethylbenzoyldiphenylphosphine oxide, BASF)

IRGACURE (registered trademark) 819 (trade name, bis(2,4,6-trimethylbenzoyl)phenylphosphine oxide, BASF)

Surfactant Having Polymerizable Group: Component E

TEGO (registered trademark) Rad 2100 (trade name, silicone-based surfactant, pentafunctional acrylate, EVONIK)

TEGO (registered trademark) Rad 2500 (trade name, silicone-based surfactant, bifunctional acrylate, EVONIK)

BYK-UV 3500 (trade name, silicone-based surfactant, bifunctional acrylate, BYK Chemie GmbH)

MEGAFACE (registered trademark) RS-76-NS (trade name, fluorosurfactant, bifunctional acrylate, DIC Corporation)

Other Monomers

Tricyclodecanedimethanol diacrylate (trade name: SR833, polyfunctional monomer, Sartomer)

Isobornyl acrylate (trade name: SR506, monofunctional monomer, Sartomer)

The following are the structures of SR833 and SR506.

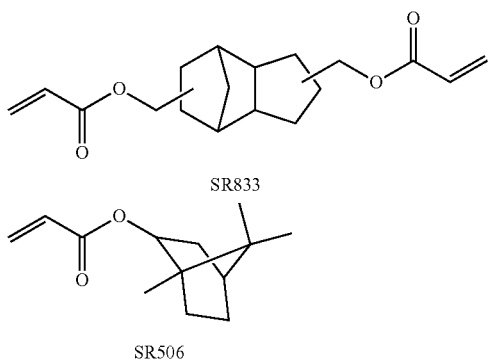

Comparative Surfactant

BYK-307 (trade name, silicone-based surfactant not having polymerizable groups, polyether-modified polydimethylsiloxane, BYK Chemie GmbH)

Comparative Polymerization Inhibitors

OH-TEMPO (trade name, 4-hydroxy-2,2,6,6-tetramethylpiperidinyloxy, ADEKA CORPORATION)

FLORSTAB UV12 (trade name, tris(N-nitroso-N-phenylhydroxylamine) aluminum salt, nitroso-based polymerization inhibitor, Kromachem Ltd)

Pigment Dispersion

Preparation of Black Mill Base

SPECIAL BLACK 250 (trade name, black pigment, BASF): 30 parts by mass

SR595 (trade name, dispersion medium, Sartomer): 50 parts by mass

SOLSPERSE (registered trademark) 32000 (trade name, dispersing agent, Noveon, Inc.): 20 parts by mass The above-described components were stirred and mixed; the resultant solution was charged into a dispersing apparatus (product name: Motormill M50, Eiger Torrance Ltd) and dispersed with zirconia beads having a diameter of 0.65 mm and at a rotation speed of 9 m/s for 8 hours to obtain a black mill base.

Preparation of Cyan Mill Base

IRGALITE BLUE GLVO (trade name, cyan pigment, BASF): 300 parts by mass

SR595 (trade name, dispersion medium, Sartomer): 620 parts by mass

SOLSPERSE (registered trademark) 32000 (trade name, dispersing agent, Noveon, Inc.): 80 parts by mass The above-described components were stirred and mixed; the resultant solution was charged into a dispersing apparatus (product name: Motormill M50, Eiger Torrance Ltd) and dispersed with zirconia beads having a diameter of 0.65 mm and at a rotation speed of 9 m/s for 4 hours to obtain a cyan mill base.

Preparation of Magenta Mill Base

CINQUASIA MAGENTA RT-355-D (trade name, magenta pigment, BASF): 30 parts by mass SR595 (trade name, dispersion medium, Sartomer): 50 parts by mass SOLSPERSE (registered trademark) 32000 (trade name, dispersing agent, Noveon, Inc.): 20 parts by mass The above-described components were stirred and mixed; the resultant solution was charged into a dispersing apparatus (product name: Motormill M50, Eiger Torrance Ltd) and dispersed with zirconia beads having a diameter of 0.65 mm and at a rotation speed of 9 m/s for 8 hours to obtain a magenta mill base.

Preparation of Yellow Mill Base

NOVOPERM YELLOW H2G (trade name, yellow pigment, Clariant): 30 parts by mass

SR595 (trade name, dispersion medium, Sartomer): 50 parts by mass

SOLSPERSE (registered trademark) 32000 (trade name, dispersing agent, Noveon, Inc.): 20 parts by mass The above-described components were stirred and mixed; the resultant solution was charged into a dispersing apparatus (product name: Motormill M50, Eiger Torrance Ltd) and dispersed with zirconia beads having a diameter of 0.65 mm and at a rotation speed of 9 m/s for 8 hours to obtain a yellow mill base.

Preparation of White Mill Base

TIPAQUE CR60-2 (trade name, white pigment, ISHIHARA SANGYO KAISHA, LTD.): 50 parts by mass SR595 (trade name, dispersion medium, Sartomer): 45 parts by mass SOLSPERSE (registered trademark) 41000 (trade name, dispersing agent, Noveon, Inc.): 5 parts by mass The above-described components were stirred and mixed; the resultant solution was charged into a dispersing apparatus (product name: Motormill M50, Eiger Torrance Ltd) and dispersed with zirconia beads having a diameter of 0.65 mm and at a rotation speed of 9 m/s for 8 hours to obtain a white mill base.

Preparation of Ink Compositions

Example 1 to Example 50

Components described in Table 1-1 to Table 5 were mixed in amounts described in Table 1-1 to Table 5 and stirred to obtain ink compositions of Example 1 to Example 50.

Comparative Example 1 to Comparative Example 12

Components described in Tables 6-1 and 6-2 were mixed in amounts described in Tables 6-1 and 6-2 and stirred to obtain ink compositions of Comparative Example 1 to Comparative Example 12.

Ink Jet Recording Method

An ink jet recording apparatus having piezo ink jet nozzles was used to perform recording on recording media. The ink supply device includes, for example, a source tank, supply pipes, an ink supply tank disposed immediately upstream of an ink jet head, a filter, and a piezo ink jet head. A region extending from the ink supply tank to the ink jet head was thermally insulated and heated.

Temperature sensors were disposed near the ink supply tank and the nozzles of the ink jet head; and temperature control was performed such that the temperature at the nozzle portion was kept at 45° C.±2° C. The piezo ink jet head was operated to eject multisize dots of from 1 pl to 60 pl at a resolution of 1,200×1,200 dpi. After the ink composition landed, irradiation with UV light was performed at an illuminance of 1,200 mW/cm$^2$ for the exposed surface; the exposure device, the main scanning speed, and the ejection wavelength were adjusted such that the irradiation started after the lapse of 0.1 seconds from landing of the ink composition on a recording medium. The exposure was performed for a variable period, and exposure energy was radiated. The ultraviolet lamp employed was an LED lamp (GS Yuasa Corporation).

An image is formed by five strokes of the head. Thus, the ink droplets having firstly landed are irradiated with light at a dose corresponding to five strokes. Each stroke provides a dose of about 100 mJ/cm$^2$, and hence the total dose of five strokes is 500 mJ/cm$^2$.

Evaluation

The ink compositions obtained above in Example 1 to Example 50 and Comparative Example 1 to Comparative Example 12 were evaluated in the following manner. The results are described in Table 1-1 to Table 6-2.

Glossiness

In accordance with the above-described ink jet recording method, on a polyvinyl chloride film serving as a recording medium, such an ink composition was used to print a 100% solid image (Solid image) having an average film thickness of 10 μm. The image obtained was measured for glossiness, in accordance with JIS Z8741-1997, with an Ultra High Gloss Checker IG-410 (HORIBA, Ltd.), at a measurement angle of 60°.

The evaluation grades are as follows. In the following evaluation grades, "5" represents the highest glossiness; "3", "4", and "5" are practically acceptable.

Evaluation Grades
  5: The glossiness is 90 or more.
  4: The glossiness is 80 or more and less than 90.
  3: The glossiness is 70 or more and less than 80.
  2: The glossiness is 60 or more and less than 70.
  1: The glossiness is less than 60.

Blocking Resistance

In accordance with the above-described ink jet recording method, on a polyethylene terephthalate (PET) film (trade name: Viewful (registered trademark), KIMOTO Co., Ltd.) serving as a recording medium, such an ink composition was used to print a 100% solid image (Solid image) having an average film thickness of 10 μm. On the surface of the obtained image, a paper sheet having a smaller size (A6-sized paper sheet) than the image was placed; a load of 1 kg was applied (1 kg/A6 size), and the image was left in an environment at an ambient temperature of 40° C. for 24 hours. After the lapse of 24 hours, the state of transfer of the image to the paper sheet was visually inspected, and the area (area %) of the transferred image on the paper sheet was measured. Incidentally, in the case of a clear ink composition, the surface of the paper sheet was tilted with respect to a fluorescent lamp, and a glossy region derived from the clear ink composition was regarded as the transferred image on the paper sheet, and the area thereof was measured.

The evaluation grades are as follows. In the following evaluation grades, "5" represents the highest blocking resistance; "3", "4", and "5" are practically acceptable.

Evaluation Grades
  5: No transfer.
  4: The area of the image transferred on the paper sheet is more than 0% and 25% or less of the area of the paper sheet.
  3: The area of the image transferred on the paper sheet is more than 25% and 50% or less of the area of the paper sheet.
  2: The area of the image transferred on the paper sheet is more than 50% and 75% or less of the area of the paper sheet.
  1: The area of the image transferred on the paper sheet is more than 75% of the area of the paper sheet.

Stretchability

In accordance with the above-described ink jet recording method, on a polyvinyl chloride film serving as a recording medium, such an ink composition was used to print a 100% solid image (Solid image) having an average film thickness of 10 μm. The recording medium having the formed image was cut into 5 cm×2 cm to provide a measurement sample. This measurement sample was measured for stretching ratio under the following measurement conditions.

Measurement Conditions

As a measurement apparatus, a TENSILON Universal Material Testing Instrument (SHIMADZU CORPORATION) was used; in an environment at an ambient temperature of 30° C., the measurement sample was stretched at a tensile speed of 50 mm/min; the length at break was measured, and the stretching ratio was calculated.

The stretching ratio (%) was calculated using {(length at break−length before stretching)/length before stretching}× 100. For example, when the break occurs at 10 cm, the calculation is performed: {(10 cm−5 cm)/5 cm}×100=100% stretching.

The evaluation grades are as follows. In the following evaluation grades, "5" represents the highest stretchability; "3", "4", and "5" are practically acceptable.

Evaluation Grades
  5: The stretching ratio is 50% or more.
  4: The stretching ratio is 40% or more and less than 50%.
  3: The stretching ratio is 30% or more and less than 40%.
  2: The stretching ratio is 20% or more and less than 30%.
  1: The stretching ratio is less than 20%.

Adhesion

In accordance with the above-described ink jet recording method, such an ink composition was used to print a 100% solid image (Solid image) having an average film thickness of 10 μm on each of a polyvinyl chloride film and a PET film serving as recording media. To the surface of such an obtained image, a 1 cm wide piece of Sellotape (registered trademark) was affixed; the peel strength between the recording medium and the ink layer (force applied until peeling occurs: N/cm) was measured with Standard Model Digital Force Gauge ZTS series, Vertical Motorized Test Stand MX2 series, and 90° Peel Test Fixtures P90-200N/200N-EZ, and Film Grip FC series manufactured by IMADA CO., LTD., at a peel speed of 300 mm/min. The higher the peel strength, the higher the adhesion.

The evaluation grades are as follows. In the following evaluation grades, "5" represents the highest adhesion; "3", "4", and "5" are practically acceptable.

Evaluation Grades

5: For each of the polyvinyl chloride film and the PET film, the peel strength is 0.5 N/cm or more.

4: The peel strength for the polyvinyl chloride film is 0.5 N/cm or more, and the peel strength for the PET film is 0.3 N/cm or more and less than 0.5 N/cm.

3: For each of the polyvinyl chloride film and the PET film, the peel strength is 0.3 N/cm or more and less than 0.5 N/cm.

2: For each of the polyvinyl chloride film and the PET film, the peel strength is 0.1 N/cm or more and less than 0.3 N/cm.

1: For each of the polyvinyl chloride film and the PET film, the peel strength is less than 0.1 N/cm.

Temporal Stability

Each ink composition (10 mL) was charged into a 20 mL glass vial and sealed with a lid, and then stored within a thermostat (60° C.) for 4 weeks. Before and after the storage, a change in the particle size and a change in the viscosity of the ink composition were measured; on the basis of increase ratios of the average particle size and the viscosity of the ink composition before and after the storage, the temporal stability of the ink composition was evaluated. Incidentally, clear ink compositions not including pigment dispersions were evaluated on the basis of the change in the viscosity alone.

Measurement of Average Particle Size

The average particle size of the ink composition was measured with a Particle size Analyzer (product name: FPAR-1000, Otsuka Electronics Co., Ltd.). In the measurement, as a diluting agent for concentration control, 2-butanone was used.

Measurement of Viscosity

The viscosity of the ink composition was measured with an E-type viscometer (product name: TVE-35L, Toki Sangyo Co., Ltd.) at 25° C.

The evaluation grades are as follows. "3", "4", and "5" are practically acceptable.

Incidentally, the "increase ratio" is X(%)-100(%) where a value before the storage is defined as 100%, and a value after the storage for 4 weeks is defined as X %.

Evaluation Grades

5: The increase ratios of viscosity and average particle size after 4 weeks are 10% or less.

4: The increase ratios of viscosity and average particle size after 4 weeks are more than 10% and 20% or less.

3: The increase ratios of viscosity and average particle size after 4 weeks are more than 20% and 40% or less.

2: The increase ratios of viscosity and average particle size after 4 weeks are more than 40% and 60% or less.

1: The increase ratios of viscosity and average particle size after 4 weeks are more than 60%.

TABLE 1-1

| | | | | | | | | | | | (mass %) |
| --- | --- | --- | --- | --- | --- | --- | --- | --- | --- | --- | --- |
| | | | | | Example 1 | Example 2 | Example 3 | Example 4 | Example 5 | Example 6 | Example 7 |
| | | | | Number of carbon atoms of alkylene group | | | | | | | |
| Component A | Di(meth)acrylate having linear alkylene group | SR238 | | 6 | 61.5 | — | — | — | — | — | — |
| | | A-NOD-N | | 9 | — | 61.5 | — | — | — | — | — |
| | | SR595 | | 10 | — | — | — | 61.5 | 63.45 | 63.4 | 63.0 |
| | | 1,12-Dodecanediol diacrylate | | 12 | — | — | 61.5 | — | — | — | — |
| | | | | Type/Number of repeating units of AO chain | | | | | | | |
| Component B | Di(meth)acrylate having alkylene oxide chain | SR272 | | EO/3 | — | — | — | — | — | — | — |
| | | SR344 | | EO/9 | 30 | 30 | 30 | 30 | 30 | 30 | 30 |
| | | SR610 | | EO/13 | — | — | — | — | — | — | — |
| | | SR508 | | PO/2 | — | — | — | — | — | — | — |
| Other monomer | Polyfunctional monomer | SR833 | | | — | — | — | — | — | — | — |
| | Monofunctional monomer | | SR506 | | — | — | — | — | — | — | — |
| Component C | Cyclohexyldienone-based polymerization inhibitor | | UV22 | | 0.5 | 0.5 | 0.5 | 0.5 | 0.5 | 0.5 | 0.5 |
| | | | TMDPQ | | — | — | — | — | — | — | — |
| | | | DBDMDPQ | | — | — | — | — | — | — | — |
| | | | TBDPQ | | — | — | — | — | — | — | — |
| Comparative polymerization inhibitor | | | UV12 | | — | — | — | — | — | — | — |
| | | | OH-TEMPO | | — | — | — | — | — | — | — |

TABLE 1-1-continued

| | | | | Example 1 | Example 2 | Example 3 | Example 4 | Example 5 | Example 6 | Example 7 |
|---|---|---|---|---|---|---|---|---|---|---|
| | | | | | | | | | | (mass %) |
| Component D | Photopolymerization initiator | DAROCUR TPO | | 3 | 3 | 3 | 3 | 3 | 3 | 3 |
| | | IRGACURE 819 | | 3 | 3 | 3 | 3 | 3 | 3 | 3 |
| | | | Type | | | | | | | |
| Component E | Surfactant having polymerizable group | TEGO Rad 2100 | Silicone-based | 2 | 2 | 2 | 2 | 0.05 | 0.1 | 0.5 |
| | | TEGO Rad 2500 | Silicone-based | — | — | — | — | — | — | — |
| | | BYK-UV 3500 | Silicone-based | — | — | — | — | — | — | — |
| | | MEGAFACE RS-76-NS | Fluorine-based | — | — | — | — | — | — | — |
| Comparative surfactant | | BYK-307 | | — | — | — | — | — | — | — |
| | Total | | | 100 | 100 | 100 | 100 | 100 | 100 | 100 |
| Ratio of content of component A to content of component B (content of component A/content of component B) | | | | 2.1 | 2.1 | 2.1 | 2.1 | 2.1 | 2.1 | 2.1 |
| Ratio of content of component A to content of component C (content of component A/content of component C) | | | | 123 | 123 | 123 | 123 | 127 | 127 | 126 |
| Evaluation items | | Glossiness | | 4 | 4 | 5 | 5 | 3 | 3 | 4 |
| | | Blocking resistance | | 5 | 5 | 5 | 5 | 3 | 3 | 4 |
| | | Stretchability | | 3 | 4 | 5 | 5 | 5 | 5 | 5 |
| | | Adhesion | | 5 | 5 | 5 | 5 | 5 | 5 | 5 |
| | | Temporal stability | | 4 | 4 | 5 | 5 | 5 | 5 | 5 |

TABLE 1-2

| | | | | Example 8 | Example 9 | Example 10 | Example 11 | Example 12 | Example 13 | Example 14 |
|---|---|---|---|---|---|---|---|---|---|---|
| | | | | | | | | | | (mass %) |
| | | | Number of carbon atoms of alkylene group | | | | | | | |
| Component A | Di(meth)acrylate having linear alkylene group | SR238 | 6 | — | — | — | — | — | — | — |
| | | A-NOD-N | 9 | — | — | — | — | — | — | — |
| | | SR595 | 10 | 62.5 | 59.5 | 58.5 | 53.5 | 51.5 | 61.5 | 61.5 |
| | | 1,12-Dodecanediol diacrylate | 12 | — | — | — | — | — | — | — |
| | | | Type/Number of repeating units of AO chain | | | | | | | |
| Component B | Di(meth)acrylate having alkylene oxide chain | SR272 | EO/3 | — | — | — | — | — | — | — |
| | | SR344 | EO/9 | 30 | 30 | 30 | 30 | 30 | 30 | 30 |
| | | SR610 | EO/13 | — | — | — | — | — | — | — |
| | | SR508 | PO/2 | — | — | — | — | — | — | — |
| Other monomer | Polyfunctional monomer | SR833 | | — | — | — | — | — | — | — |
| | Monofunctional monomer | SR506 | | — | — | — | — | — | — | — |
| Component C | Cyclohexyldienone-based polymerization inhibitor | UV22 | | 0.5 | 0.5 | 0.5 | 0.5 | 0.5 | 0.5 | 0.5 |
| | | TMDPQ | | — | — | — | — | — | — | — |
| | | DBDMDPQ | | — | — | — | — | — | — | — |
| | | TBDPQ | | — | — | — | — | — | — | — |
| Comparative polymerization inhibitor | | UV12 | | — | — | — | — | — | — | — |
| | | OH-TEMPO | | — | — | — | — | — | — | — |
| Component D | Photopolymerization initiator | DAROCUR TPO | | 3 | 3 | 3 | 3 | 3 | 3 | 3 |
| | | IRGACURE 819 | | 3 | 3 | 3 | 3 | 3 | 3 | 3 |
| | | | Type | | | | | | | |
| Component E | Surfactant having polymerizable group | TEGO Rad 2100 | Silicone-based | 1 | 4 | 5 | 10 | 12 | — | — |
| | | TEGO Rad 2500 | Silicone-based | — | — | — | — | — | 2 | — |
| | | BYK-UV 3500 | Silicone-based | — | — | — | — | — | — | 2 |
| | | MEGAFACE RS-76-NS | Fluorine-based | — | — | — | — | — | — | — |
| Comparative surfactant | | BYK-307 | | — | — | — | — | — | — | — |
| | Total | | | 100 | 100 | 100 | 100 | 100 | 100 | 100 |
| Ratio of content of component A to content of component B (content of component A/content of component B) | | | | 2.1 | 2.0 | 2.0 | 1.8 | 1.7 | 2.1 | 2.1 |

TABLE 1-2-continued (mass %)

| | | | Example 8 | Example 9 | Example 10 | Example 11 | Example 12 | Example 13 | Example 14 |
|---|---|---|---|---|---|---|---|---|---|
| Ratio of content of component A to content of component C (content of component A/content of component C) | | | 125 | 119 | 117 | 107 | 103 | 123 | 123 |
| Evaluation items | | Glossiness | 5 | 5 | 4 | 4 | 3 | 5 | 5 |
| | | Blocking resistance | 5 | 5 | 5 | 4 | 4 | 5 | 5 |
| | | Stretchability | 5 | 5 | 3 | 3 | 3 | 5 | 5 |
| | | Adhesion | 5 | 5 | 5 | 5 | 5 | 5 | 5 |
| | | Temporal stability | 5 | 5 | 5 | 5 | 4 | 5 | 5 |

TABLE 2-1

(mass %)

| | | | | Example 4 | Example 15 | Example 16 | Example 17 | Example 18 | Example 19 |
|---|---|---|---|---|---|---|---|---|---|
| | | | Number of carbon atoms of alkylene group | | | | | | |
| Component A | Di(meth)acrylate having linear alkylene group | SR238 | 6 | — | — | — | — | — | — |
| | | A-NOD-N | 9 | — | — | — | — | — | — |
| | | SR595 | 10 | 61.5 | 61.97 | 61.95 | 61.92 | 61.9 | 60.5 |
| | | 1,12-Dodecanediol diacrylate | 12 | — | — | — | — | — | — |
| | | | Type/Number of repeating units of AO chain | | | | | | |
| Component B | Di(meth)acrylate having alkylene oxide chain | SR272 | EO/3 | — | — | — | — | — | — |
| | | SR344 | EO/9 | 30 | 30 | 30 | 30 | 30 | 30 |
| | | SR610 | EO/13 | — | — | — | — | — | — |
| | | SR508 | PO/2 | — | — | — | — | — | — |
| Other monomer | Polyfunctional monomer | SR833 | | — | — | — | — | — | — |
| | Monofunctional monomer | SR506 | | — | — | — | — | — | — |
| Component C | Cyclohexyldienone-based polymerization inhibitor | UV22 | | 0.5 | 0.03 | 0.05 | 0.08 | 0.1 | 1.5 |
| | | TMDPQ | | — | — | — | — | — | — |
| | | DBDMDPQ | | — | — | — | — | — | — |
| | | TBDPQ | | — | — | — | — | — | — |
| Comparative polymerization inhibitor | | UV12 | | — | — | — | — | — | — |
| | | OH-TEMPO | | — | — | — | — | — | — |
| Component D | Photopolymerization initiator | DAROCUR TPO | | 3 | 3 | 3 | 3 | 3 | 3 |
| | | IRGACURE 819 | | 3 | 3 | 3 | 3 | 3 | 3 |
| | | | Type | | | | | | |
| Component E | Surfactant having polymerizable group | TEGO Rad 2100 | Silicone-based | 2 | 2 | 2 | 2 | 2 | 2 |
| | | TEGO Rad 2500 | Silicone-based | — | — | — | — | — | — |
| | | BYK-UV 3500 | Silicone-based | — | — | — | — | — | — |
| | | MEGAFACE RS-76-NS | Fluorine-based | — | — | — | — | — | — |
| Comparative surfactant | | BYK-307 | | — | — | — | — | — | — |
| Total | | | | 100 | 100 | 100 | 100 | 100 | 100 |
| Ratio of content of component A to content of component B (content of component A/content of component B) | | | | 2.1 | 2.1 | 2.1 | 2.1 | 2.1 | 2.0 |
| Ratio of content of component A to content of component C (content of component A/content of component C) | | | | 123 | 2066 | 1239 | 774 | 619 | 40 |
| Evaluation items | | Glossiness | | 5 | 3 | 3 | 4 | 5 | 5 |
| | | Blocking resistance | | 5 | 5 | 5 | 5 | 5 | 5 |
| | | Stretchability | | 5 | 5 | 5 | 5 | 5 | 5 |
| | | Adhesion | | 5 | 5 | 5 | 5 | 5 | 5 |
| | | Temporal stability | | 5 | 3 | 4 | 4 | 5 | 5 |

TABLE 2-2

|  |  |  |  | Example 20 | Example 21 | Example 22 | Example 23 | Example 24 | (mass %) Example 25 |
|---|---|---|---|---|---|---|---|---|---|
|  |  |  | Number of carbon atoms of alkylene group |  |  |  |  |  |  |
| Component A | Di(meth)acrylate having linear alkylene group | SR238 | 6 | — | — | — | — | — | — |
|  |  | A-NOD-N | 9 | — | — | — | — | — | — |
|  |  | SR595 | 10 | 60.0 | 59.0 | 61.5 | 61.5 | 61.5 | 59.5 |
|  |  | 1,12-Dodecanediol diacrylate | 12 | — | — | — | — | — | — |
|  |  |  | Type/ Number of repeating units of AO chain |  |  |  |  |  |  |
| Component B | Di(meth)acrylate having alkylene oxide chain | SR272 | EO/3 | — | — | — | — | — | — |
|  |  | SR344 | EO/9 | 30 | 30 | 30 | 30 | 30 | 30 |
|  |  | SR610 | EO/13 | — | — | — | — | — | — |
|  |  | SR508 | PO/2 | — | — | — | — | — | — |
| Other monomer | Polyfunctional monomer | SR833 |  | — | — | — | — | — | — |
|  | Monofunctional monomer | SR506 |  | — | — | — | — | — | — |
| Component C | Cyclohexyldienone-based polymerization inhibitor | UV22 |  | 2 | 3 | — | — | — | 0.5 |
|  |  | TMDPQ |  | — | — | 0.5 | — | — | — |
|  |  | DBDMDPQ |  | — | — | — | 0.5 | — | — |
|  |  | TBDPQ |  | — | — | — | — | 0.5 | — |
| Comparative polymerization inhibitor |  | UV12 |  | — | — | — | — | — | — |
|  |  | OH-TEMPO |  | — | — | — | — | — | — |
| Component D | Photopolymerization initiator | DAROCUR TPO |  | 3 | 3 | 3 | 3 | 3 | 3 |
|  |  | IRGACURE 819 |  | 3 | 3 | 3 | 3 | 3 | 3 |
|  |  |  | Type |  |  |  |  |  |  |
| Component E | Surfactant having polymerizable group | TEGO Rad 2100 | Silicone-based | 2 | 2 | 2 | 2 | 2 | — |
|  |  | TEGO Rad 2500 | Silicone-based | — | — | — | — | — | — |
|  |  | BYK-UV 3500 | Silicone-based | — | — | — | — | — | — |
|  |  | MEGAFACE RS-76-NS | Fluorine-based | — | — | — | — | — | 4 |
| Comparative surfactant |  | BYK-307 |  | — | — | — | — | — | — |
|  | Total |  |  | 100 | 100 | 100 | 100 | 100 | 100 |
| Ratio of content of component A to content of component B (content of component A/content of component B) |  |  |  | 2.0 | 2.0 | 2.1 | 2.1 | 2.1 | 2.0 |
| Ratio of content of component A to content of component C (content of component A/content of component C) |  |  |  | 30 | 20 | 123 | 123 | 123 | 119 |
| Evaluation items |  | Glossiness |  | 4 | 3 | 5 | 5 | 5 | 5 |
|  |  | Blocking resistance |  | 4 | 3 | 5 | 5 | 5 | 4 |
|  |  | Stretchability |  | 5 | 5 | 5 | 5 | 5 | 5 |
|  |  | Adhesion |  | 4 | 3 | 5 | 5 | 5 | 5 |
|  |  | Temporal stability |  | 5 | 5 | 4 | 5 | 5 | 5 |

TABLE 3-1

|  |  |  |  | Example 4 | Example 26 | Example 27 | Example 28 | Example 29 | Example 30 | (mass %) Example 31 |
|---|---|---|---|---|---|---|---|---|---|---|
|  |  |  | Number of carbon atoms of alkylene group |  |  |  |  |  |  |  |
| Component A | Di(meth)acrylate having linear | SR238 | 6 | — | — | — | — | — | — | — |
|  |  | A-NOD-N | 9 | — | — | — | — | — | — | — |
|  |  | SR595 | 10 | 61.5 | 61.5 | 61.5 | 90.5 | 86.5 | 81.5 | 76.5 |

TABLE 3-1-continued

| | | | | Example 4 | Example 26 | Example 27 | Example 28 | Example 29 | Example 30 | (mass %) Example 31 |
|---|---|---|---|---|---|---|---|---|---|---|
| | alkylene group | 1,12-Dodecanediol diacrylate | 12 | — | — | — | — | — | — | — |
| | | | Type/ Number of repeating units of AO chain | | | | | | | |
| Component B | Di(meth)acrylate having alkylene oxide chain | SR272 | EO/3 | — | 30 | — | — | — | — | — |
| | | SR344 | EO/9 | 30 | — | — | 1 | 5 | 10 | 15 |
| | | SR610 | EO/13 | — | — | 30 | — | — | — | — |
| | | SR508 | PO/2 | — | — | — | — | — | — | — |
| Other monomer | Polyfunctional monomer | SR833 | | — | — | — | — | — | — | — |
| | Monofunctional monomer | SR506 | | — | — | — | — | — | — | — |
| Component C | Cyclo-hexyldienone-based polymerization inhibitor | UV22 | | 0.5 | 0.5 | 0.5 | 0.5 | 0.5 | 0.5 | 0.5 |
| | | TMDPQ | | — | — | — | — | — | — | — |
| | | DBDMDPQ | | — | — | — | — | — | — | — |
| | | TBDPQ | | — | — | — | — | — | — | — |
| Comparative polymerization inhibitor | | UV12 | | — | — | — | — | — | — | — |
| | | OH-TEMPO | | — | — | — | — | — | — | — |
| Component D | Photo-polymerization initiator | DAROCUR TPO | | 3 | 3 | 3 | 3 | 3 | 3 | 3 |
| | | IRGACURE 819 | | 3 | 3 | 3 | 3 | 3 | 3 | 3 |
| | | | Type | | | | | | | |
| Component E | Surfactant having polymerizable group | TEGO Rad 2100 | Silicone-based | 2 | 2 | 2 | 2 | 2 | 2 | 2 |
| | | TEGO Rad 2500 | Silicone-based | — | — | — | — | — | — | — |
| | | BYK-UV 3500 | Silicone-based | — | — | — | — | — | — | — |
| | | MEGAFACE RS-76-NS | Fluorine-based | — | — | — | — | — | — | — |
| Comparative surfactant | | BYK-307 | | — | — | — | — | — | — | — |
| | | Total | | 100 | 100 | 100 | 100 | 100 | 100 | 100 |
| | Ratio of content of component A to content of component B (content of component A/content of component B) | | | 2.1 | 2.1 | 2.1 | 90.5 | 17.3 | 8.2 | 5.1 |
| | Ratio of content of component A to content of component C (content of component A/content of component C) | | | 123 | 123 | 123 | 181 | 173 | 163 | 153 |
| Evaluation items | Glossiness | | | 5 | 4 | 4 | 4 | 5 | 5 | 5 |
| | Blocking resistance | | | 5 | 5 | 4 | 3 | 4 | 4 | 4 |
| | Stretchability | | | 5 | 5 | 5 | 3 | 3 | 4 | 4 |
| | Adhesion | | | 5 | 5 | 5 | 5 | 5 | 5 | 5 |
| | Temporal stability | | | 5 | 5 | 5 | 5 | 5 | 5 | 5 |

TABLE 3-2

| | | | | Example 32 | Example 33 | Example 34 | Example 35 | Example 36 | (mass %) Example 37 |
|---|---|---|---|---|---|---|---|---|---|
| | | | Number of carbon atoms of alkylene group | | | | | | |
| Component A | Di(meth)acrylate having linear alkylene group | SR238 | 6 | — | — | — | — | — | — |
| | | A-NOD-N | 9 | — | — | — | — | — | — |
| | | SR595 | 10 | 72.0 | 51.5 | 46.5 | 41.5 | 21.5 | 12.0 |
| | | 1,12-Dodecanediol diacrylate | 12 | — | — | — | — | — | — |

TABLE 3-2-continued

| | | | | Example 32 | Example 33 | Example 34 | Example 35 | Example 36 | (mass %) Example 37 |
|---|---|---|---|---|---|---|---|---|---|
| | | | Type/Number of repeating units of AO chain | | | | | | |
| Component B | Di(meth)acrylate having alkylene oxide chain | SR272 | EO/3 | — | — | — | — | — | — |
| | | SR344 | EO/9 | 19.5 | 40 | 45 | 50 | 70 | 79.5 |
| | | SR610 | EO/13 | — | — | — | — | — | — |
| | | SR508 | PO/2 | — | — | — | — | — | — |
| Other monomer | Polyfunctional monomer | SR833 | | — | — | — | — | — | — |
| | Monofunctional monomer | SR506 | | — | — | — | — | — | — |
| Component C | Cyclohexyldienone-based polymerization inhibitor | UV22 | | 0.5 | 0.5 | 0.5 | 0.5 | 0.5 | 0.5 |
| | | TMDPQ | | — | — | — | — | — | — |
| | | DBDMDPQ | | — | — | — | — | — | — |
| | | TBDPQ | | — | — | — | — | — | — |
| Comparative polymerization inhibitor | | UV12 | | — | — | — | — | — | — |
| | | OH-TEMPO | | — | — | — | — | — | — |
| Component D | Photopolymerization initiator | DAROCUR TPO | | 3 | 3 | 3 | 3 | 3 | 3 |
| | | IRGACURE 819 | | 3 | 3 | 3 | 3 | 3 | 3 |
| | | | Type | | | | | | |
| Component E | Surfactant having polymerizable group | TEGO Rad 2100 | Silicone-based | 2 | 2 | 2 | 2 | 2 | 2 |
| | | TEGO Rad 2500 | Silicone-based | — | — | — | — | — | — |
| | | BYK-UV 3500 | Silicone-based | — | — | — | — | — | — |
| | | MEGAFACE RS-76-NS | Fluorine-based | — | — | — | — | — | — |
| Comparative surfactant | | BYK-307 | | — | — | — | — | — | — |
| | Total | | | 100 | 100 | 100 | 100 | 100 | 100 |
| Ratio of content of component A to content of component B (content of component A/content of component B) | | | | 3.7 | 1.3 | 1.0 | 0.8 | 0.3 | 0.2 |
| Ratio of content of component A to content of component C (content of component A/content of component C) | | | | 144 | 103 | 93 | 83 | 43 | 24 |
| Evaluation items | | Glossiness | | 5 | 5 | 4 | 4 | 3 | 3 |
| | | Blocking resistance | | 5 | 5 | 5 | 5 | 5 | 5 |
| | | Stretchability | | 4 | 5 | 5 | 5 | 5 | 5 |
| | | Adhesion | | 5 | 5 | 5 | 4 | 4 | 3 |
| | | Temporal stability | | 5 | 5 | 5 | 5 | 4 | 3 |

TABLE 4

| | | | | Example 4 | Example 38 | Example 39 | Example 40 | Example 41 | Example 42 | (mass %) Example 43 |
|---|---|---|---|---|---|---|---|---|---|---|
| | | | Number of carbon atoms of alkylene group | | | | | | | |
| Component A | Di(meth)acrylate having linear alkylene group | SR238 | 6 | — | — | — | — | — | — | — |
| | | A-NOD-N | 9 | — | — | — | — | — | — | — |
| | | SR595 | 10 | 61.5 | 51.5 | 51.5 | 51.5 | 19.0 | 39.0 | 59.0 |
| | | 1,12-Dodecanediol diacrylate | 12 | — | — | — | — | — | — | — |
| | | | Type/Number of repeating units of AO chain | | | | | | | |
| Component B | Di(meth)acrylate having alkylene oxide chain | SR272 | EO/3 | — | — | — | — | — | — | — |
| | | SR344 | EO/9 | 30 | 30 | 30 | 30 | 1 | 1 | 1 |
| | | SR610 | EO/13 | — | — | — | — | — | — | — |
| | | SR508 | PO/2 | — | — | — | 10 | — | — | — |

TABLE 4-continued (mass %)

| | | | | Example 4 | Example 38 | Example 39 | Example 40 | Example 41 | Example 42 | Example 43 |
|---|---|---|---|---|---|---|---|---|---|---|
| Other monomer | Polyfunctional monomer | SR833 | | — | 10 | — | — | — | — | — |
| | Monofunctional monomer | SR506 | | — | — | — | 10 | 71.5 | 51.5 | 31.5 |
| Component C | Cyclohexyldienone-based polymerization inhibitor | UV22 | | 0.5 | 0.5 | 0.5 | 0.5 | 0.5 | 0.5 | 0.5 |
| | | TMDPQ | | — | — | — | — | — | — | — |
| | | DBDMDPQ | | — | — | — | — | — | — | — |
| | | TBDPQ | | — | — | — | — | — | — | — |
| | Comparative polymerization inhibitor | UV12 | | — | — | — | — | — | — | — |
| | | OH-TEMPO | | — | — | — | — | — | — | — |
| Component D | Photopolymerization initiator | DAROCUR TPO | | 3 | 3 | 3 | 3 | 3 | 3 | 3 |
| | | IRGACURE 819 | | 3 | 3 | 3 | 3 | 3 | 3 | 3 |
| | | | Type | | | | | | | |
| Component E | Surfactant having polymerizable group | TEGO Rad 2100 | Silicone-based | 2 | 2 | 2 | 2 | 2 | 2 | 2 |
| | | TEGO Rad 2500 | Silicone-based | — | — | — | — | — | — | — |
| | | BYK-UV 3500 | Silicone-based | — | — | — | — | — | — | — |
| | | MEGAFACE RS-76-NS | Fluorine-based | — | — | — | — | — | — | — |
| | Comparative surfactant | BYK-307 | | — | — | — | — | — | — | — |
| | Total | | | 100 | 100 | 100 | 100 | 100 | 100 | 100 |
| | Ratio of content of component A to content of component B (content of component A/content of component B) | | | 2.1 | 1.7 | 1.3 | 1.7 | 19.0 | 39.0 | 59.0 |
| | Ratio of content of component A to content of component C (content of component A/content of component C) | | | 123 | 103 | 103 | 103 | 38 | 78 | 118 |
| | Evaluation items | Glossiness | | 5 | 5 | 4 | 5 | 4 | 5 | 5 |
| | | Blocking resistance | | 5 | 5 | 5 | 3 | 3 | 3 | 4 |
| | | Stretchability | | 5 | 3 | 5 | 5 | 5 | 5 | 5 |
| | | Adhesion | | 5 | 5 | 5 | 5 | 3 | 4 | 4 |
| | | Temporal stability | | 5 | 5 | 5 | 5 | 5 | 5 | 5 |

TABLE 5

(mass %)

| | | | | Example 4 | Example 44 | Example 45 | Example 46 | Example 47 | Example 48 | Example 49 | Example 50 |
|---|---|---|---|---|---|---|---|---|---|---|---|
| | | | Number of carbon atoms of alkylene group | | | | | | | | |
| Component A | Di(meth)acrylate having linear alkylene group | SR238 | 6 | — | — | — | — | — | — | — | — |
| | | A-NOD-N | 9 | — | — | — | — | — | — | — | — |
| | | SR595 | 10 | 61.5 | 55.5 | 53.5 | 46.5 | 51.5 | 41.5 | 61.5 | 61.5 |
| | | 1,12-Dodecanediol diacrylate | 12 | — | — | — | — | — | — | — | — |
| | | | Type/Number of repeating units of AO chain | | | | | | | | |
| Component B | Di(meth)acrylate having alkylene oxide chain | SR230 | EO/2 | — | — | — | — | — | — | — | 30 |
| | | SR272 | EO/3 | — | — | — | — | — | — | — | — |
| | | SR344 | EO/9 | 30 | 30 | 30 | 30 | 30 | 20 | 30 | — |
| | | SR610 | EO/13 | — | — | — | — | — | — | — | — |
| | | SR508 | PO/2 | — | — | — | — | — | — | — | — |
| Other monomer | Polyfunctional monomer | SR833 | | — | — | — | — | — | — | — | — |
| | Monofunctional monomer | SR506 | | — | — | — | — | — | — | — | — |

TABLE 5-continued (mass %)

| | | Example 4 | Example 44 | Example 45 | Example 46 | Example 47 | Example 48 | Example 49 | Example 50 |
|---|---|---|---|---|---|---|---|---|---|
| Pigment dispersion | Black mill base | — | 6 | — | — | — | — | — | — |
| | Cyan mill base | — | — | 8 | — | — | — | — | — |
| | Magenta mill base | — | — | — | 15 | — | — | — | — |
| | Yellow mill base | — | — | — | — | 10 | — | — | — |
| | White mill base | — | — | — | — | — | 30 | — | — |
| Component C Cyclohexyldienone-based polymerization inhibitor | UV22 | 0.5 | 0.5 | 0.5 | 0.5 | 0.5 | 0.5 | 0.5 | 0.5 |
| | TMDPQ | — | — | — | — | — | — | — | — |
| | DBDMDPQ | — | — | — | — | — | — | — | — |
| | TBDPQ | — | — | — | — | — | — | — | — |
| Comparative polymerization inhibitor | UV12 | — | — | — | — | — | — | — | — |
| | OH-TEMPO | — | — | — | — | — | — | — | — |
| Component D Photopolymerization initiator | DAROCUR TPO | 3 | 3 | 3 | 3 | 3 | 3 | 3 | 3 |
| | IRGACURE 819 | 3 | 3 | 3 | 3 | 3 | 3 | 3 | 3 |
| | Type | | | | | | | | |
| Component E Surfactant having polymerizable group | TEGO Rad 2100 | Silicone-based | 2 | 2 | 2 | 2 | 2 | 2 | — | 2 |
| | TEGO Rad 2500 | Silicone-based | — | — | — | — | — | — | — | — |
| | BYK-UV 3500 | Silicone-based | — | — | — | — | — | — | — | — |
| | MEGAFACE RS-76-NS | Fluorine-based | — | — | — | — | — | — | — | — |
| Comparative surfactant | BYK-307 | — | — | — | — | — | — | 2 | — |
| Total | | 100 | 100 | 100 | 100 | 100 | 100 | 100 | 100 |
| Ratio of content of component A to content of component B (content of component A/content of component B)* | | 2.1 | 1.9 | 1.8 | 1.6 | 1.7 | 2.1 | 2.0 | 2.0 |
| Ratio of content of component A to content of component C (content of component A/content of component C)* | | 123 | 111 | 107 | 93 | 103 | 83 | 119 | 119 |
| Evaluation items | Glossiness | 5 | 5 | 5 | 5 | 5 | 5 | 5 | 4 |
| | Blocking resistance | 5 | 5 | 5 | 5 | 5 | 5 | 3 | 5 |
| | Stretchability | 5 | 5 | 5 | 5 | 5 | 5 | 5 | 4 |
| | Adhesion | 5 | 5 | 5 | 5 | 5 | 5 | 5 | 5 |
| | Temporal stability | 5 | 5 | 5 | 5 | 5 | 5 | 5 | 5 |

TABLE 6-1

(mass %)

| | | | Comparative Example 1 | Comparative Example 2 | Comparative Example 3 | Comparative Example 4 | Comparative Example 5 | Comparative Example 6 |
|---|---|---|---|---|---|---|---|---|
| | | Number of carbon atoms of alkylene group | | | | | | |
| Component A Di(meth)acrylate having linear alkylene group | SR238 | 6 | — | — | — | — | — | — |
| | A-NOD-N | 9 | — | — | — | — | — | — |
| | SR595 | 10 | — | 91.5 | 91.5 | 91.5 | — | 91.5 |
| | 1,12-Dodecanediol diacrylate | 12 | — | — | — | — | — | — |
| | | Type/Number of repeating units of AO chain | | | | | | |
| Component B Di(meth)acrylate having alkylene oxide chain | SR272 | EO/3 | — | — | — | — | — | — |
| | SR344 | EO/9 | — | — | — | — | — | — |
| | SR610 | EO/13 | — | — | — | — | — | — |
| | SR508 | PO/2 | 91.5 | — | — | — | — | — |
| Other monomer | Polyfunctional monomer | SR833 | — | — | — | — | 91.5 | — |
| | Monofunctional monomer | SR506 | — | — | — | — | — | — |
| Pigment dispersion | Black mill base | | — | — | — | — | — | — |
| | Cyan mill base | | — | — | — | — | — | — |
| | Magenta mill base | | — | — | — | — | — | — |
| | Yellow mill base | | — | — | — | — | — | — |
| | White mill base | | — | — | — | — | — | — |

TABLE 6-1-continued (mass %)

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Component C | Cyclohexyldienone-based polymerization inhibitor | UV22 | | 0.5 | 0.5 | — | — | — | 0.5 |
| | | TMDPQ | | — | — | — | — | — | — |
| | | DBDMDPQ | | — | — | — | — | — | — |
| | | TBDPQ | | — | — | — | — | — | — |
| Comparative polymerization inhibitor | | UV12 | | — | — | 0.5 | — | — | — |
| | | OH-TEMPO | | — | — | — | 0.5 | 0.5 | — |
| Component D | Photopolymerization initiator | DAROCUR TPO | | 3 | 3 | 3 | 3 | 3 | 3 |
| | | IRGACURE 819 | | 3 | 3 | 3 | 3 | 3 | 3 |
| | | | Type | | | | | | |
| Component E | Surfactant having polymerizable group | TEGO Rad 2100 | Silicone-based | 2 | — | 2 | 2 | 2 | 2 |
| | | TEGO Rad 2500 | Silicone-based | — | — | — | — | — | — |
| | | BYK-UV 3500 | Silicone-based | — | — | — | — | — | — |
| | | MEGAFACE RS-76-NS | Fluorine-based | — | — | — | — | — | — |
| Comparative surfactant | | BYK-307 | | — | 2 | — | — | — | — |
| | Total | | | 100 | 100 | 100 | 100 | 100 | 100 |
| Evaluation items | | Glossiness | | 1 | 4 | 1 | 1 | 2 | 4 |
| | | Blocking resistance | | 1 | 1 | 3 | 1 | 3 | 2 |
| | | Stretchability | | 3 | 1 | 3 | 3 | 1 | 1 |
| | | Adhesion | | 1 | 2 | 3 | 3 | 2 | 2 |
| | | Temporal stability | | 3 | 5 | 1 | 1 | 1 | 5 |

TABLE 6-2

(mass %)

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| | | | Number of carbon atoms of alkylene group | | | | | | |
| Component A | Di(meth)acrylate having linear alkylene group | SR238 | 6 | — | — | — | — | — | — |
| | | A-NOD-N | 9 | — | — | — | — | — | — |
| | | SR595 | 10 | 85.5 | 83.5 | 76.5 | 81.5 | 61.5 | 61.5 |
| | | 1,12-Dodecanediol diacrylate | 12 | — | — | — | — | — | — |
| | | | Type/ Number of repeating units of AO chain | | | | | | |
| Component B | Di(meth)acrylate having alkylene oxide chain | SR272 | EO/3 | — | — | — | — | — | — |
| | | SR344 | EO/9 | — | — | — | — | — | 30 |
| | | SR610 | EO/13 | — | — | — | — | — | — |
| | | SR508 | PO/2 | — | — | — | — | — | — |
| Other monomer | Polyfunctional monomer | SR833 | | — | — | — | — | — | — |
| | Monofunctional monomer | SR506 | | — | — | — | — | — | — |
| | Pigment dispersion | Black mill base | | 6 | — | — | — | — | — |
| | | Cyan mill base | | — | 8 | — | — | — | — |
| | | Magenta mill base | | — | — | 15 | — | — | — |
| | | Yellow mill base | | — | — | — | 10 | — | — |
| | | White mill base | | — | — | — | — | 30 | — |
| Component C | Cyclohexyldienone-based polymerization inhibitor | UV22 | | 0.5 | 0.5 | 0.5 | 0.5 | 0.5 | — |
| | | TMDPQ | | — | — | — | — | — | — |
| | | DBDMDPQ | | — | — | — | — | — | — |
| | | TBDPQ | | — | — | — | — | — | — |
| Comparative polymerization inhibitor | | UV12 | | — | — | — | — | — | 0.5 |
| | | OH-TEMPO | | — | — | — | — | — | — |

TABLE 6-2-continued (mass %)

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| Component D | Photopolymerization initiator | DAROCUR TPO | | 3 | 3 | 3 | 3 | 3 | 3 |
| | | IRGACURE 819 | | 3 | 3 | 3 | 3 | 3 | 3 |
| | | | Type | | | | | | |
| Component E | Surfactant having polymerizable group | TEGO Rad 2100 | Silicone-based | 2 | 2 | 2 | 2 | 2 | 2 |
| | | TEGO Rad 2500 | Silicone-based | — | — | — | — | — | — |
| | | BYK-UV 3500 | Silicone-based | — | — | — | — | — | — |
| | | MEGAFACE RS-76-NS | Fluorine-based | — | — | — | — | — | — |
| Comparative surfactant | | BYK-307 | | — | — | — | — | — | — |
| | Total | | | 100 | 100 | 100 | 100 | 100 | 100 |
| Evaluation items | | Glossiness | | 4 | 4 | 4 | 4 | 4 | 1 |
| | | Blocking resistance | | 2 | 2 | 2 | 2 | 2 | 3 |
| | | Stretchability | | 1 | 1 | 1 | 1 | 1 | 3 |
| | | Adhesion | | 4 | 4 | 4 | 4 | 4 | 3 |
| | | Temporal stability | | 5 | 5 | 5 | 5 | 5 | 1 |

In Table 1-1 to Table 6-2, "-" in cells of components mean that the components are not included.

In Table 1-1 to Table 6-2, values in cells of components are described in units of mass %.

In Table 1-1 to Table 6-2, the alkylene oxide chain is described as "AO chain", ethylene oxide is described as "EO", and propylene oxide is described as "PO".

The ink compositions in Example 44 to Example 48 and Comparative Example 7 to Comparative Example 11 include pigment dispersions containing SR595, which is a di(meth)acrylate having a linear alkylene group. The following are the total SR595 contents in the ink compositions. Example 44: 58.5 mass %, Example 45: 58.5 mass %, Example 46: 54.0 mass %, Example 47: 56.5 mass %, Example 48: 55.0 mass %, Comparative Example 7: 88.5 mass %, Comparative Example 8: 88.5 mass %, Comparative Example 9: 84.0 mass %, Comparative Example 10: 86.5 mass %, Comparative Example 11: 75.0 mass %.

As is clear from Table 1-1 to Table 5, the ink compositions in Example 1 to Example 50 including a di(meth)acrylate having a linear alkylene group, a di(meth)acrylate having an alkylene oxide chain, a cyclohexyldienone-based polymerization inhibitor, and a photopolymerization initiator exhibited good results in evaluations of glossiness, blocking resistance, and stretchability.

In addition, the ink compositions in Example 1 to Example 50 exhibited good results in evaluations of adhesion and temporal stability.

The ink compositions in Example 3 and Example 4 in which, in the di(meth)acrylate having a linear alkylene group, the alkylene group has 10 or more carbon atoms, exhibited better results in the evaluation of stretchability than the ink compositions in Example 1 and Example 2 in which the alkylene group has less than 10 carbon atoms.

Comparison among the ink compositions in Example 4 to Example 12 has revealed the following: when an ink composition includes a surfactant having a polymerizable group, the ratio of the content of the di(meth)acrylate having a linear alkylene group to the content of the surfactant having a polymerizable group can be adjusted to thereby control, for example, the glossiness and blocking resistance of the film to be formed.

Comparison among the ink compositions in Example 4 and Example 15 to Example 21 has revealed the following: the ratio of the content of the di(meth)acrylate having a linear alkylene group to the content of the cyclohexyldienone-based polymerization inhibitor can be adjusted to thereby control, for example, the glossiness of the film to be formed.

The ink composition including, as the surfactant having a polymerizable group, a silicone-based surfactant (for example, Example 4) exhibited a better result in the evaluation of blocking resistance than the ink composition of Example 25 including a fluorosurfactant.

Comparison among the ink compositions of Example 4 and Example 28 to Example 37 has revealed the following: the ratio of the content of the di(meth)acrylate having a linear alkylene group to the content of the di(meth)acrylate having an alkylene oxide chain can be adjusted to thereby control, for example, the blocking resistance and stretchability of the film to be formed.

The ink composition of Example 49 further including the surfactant having a polymerizable group exhibited a better result in the evaluation of blocking resistance than the ink composition not further including the surfactant having a polymerizable group (for example, Example 4).

The ink compositions in which, in the di(meth)acrylate having an alkylene oxide chain, the number of repeating units of the alkylene oxide chain is 3 or more (for example, Example 4, Example 26, and Example 27) exhibited better results in the evaluation of stretchability than the ink composition of Example 50 in which the number of repeating units of the alkylene oxide chain is less than 3.

By contrast, as is clear from Tables 6-1 and 6-2, the films formed from the ink compositions in Comparative Example 1 to Comparative Example 12 not including one or more among the di(meth)acrylate having a linear alkylene group, the di(meth)acrylate having an alkylene oxide chain, and the cyclohexyldienone-based polymerization inhibitor, were poor in any one of glossiness, blocking resistance, and stretchability.

The entire contents disclosed by JP2017-014642 filed in the Japan Patent Office on Jan. 30, 2017 are incorporated herein by reference.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An actinic-ray-curable ink composition comprising:
a di(meth)acrylate having a linear alkylene group;
a di(meth)acrylate having an alkylene oxide chain;
a cyclohexyldienone-based polymerization inhibitor that includes at least one selected from the group consisting of a compound represented by Formula (1) below and a compound represented by Formula (2) below; and
a photopolymerization initiator,

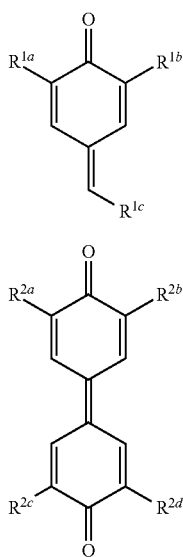

wherein, in Formula (1), $R^{1a}$ and $R^{1b}$ each independently represent an alkyl group having 1 to 8 carbon atoms, $R^{1c}$ represents a phenyl group or a cyclohexyl group, and
wherein, in Formula (2), $R^{2a}$, $R^{2b}$, $R^{2c}$, and $R^{2d}$ each independently represent an alkyl group having 1 to 8 carbon atoms.

2. The actinic-ray-curable ink composition according to claim 1, wherein, in the di(meth)acrylate having a linear alkylene group, the alkylene group has 10 or more carbon atoms.

3. The actinic-ray-curable ink composition according to claim 1, wherein, in the di(meth)acrylate having an alkylene oxide chain, the alkylene oxide chain has 3 or more repeating units.

4. The actinic-ray-curable ink composition according to claim 1, wherein the cyclohexyldienone-based polymerization inhibitor includes the compound represented by Formula (1), in which at least one of $R^{1a}$ or $R^{1b}$ is a t-butyl group.

5. The actinic-ray-curable ink composition according to claim 1, wherein a content ratio of the di(meth)acrylate having a linear alkylene group relative to a total mass of the actinic-ray-curable ink composition is from 40 mass % to 75 mass %.

6. The actinic-ray-curable ink composition according to claim 1, wherein a content ratio of the di(meth)acrylate having an alkylene oxide chain relative to a total mass of the actinic-ray-curable ink composition is from 15 mass % to 50 mass %.

7. The actinic-ray-curable ink composition according to claim 1, wherein a content ratio of the cyclohexyldienone-based polymerization inhibitor relative to a total mass of the actinic-ray-curable ink composition is from 0.08 mass % to 2 mass %.

8. The actinic-ray-curable ink composition according to claim 1, further comprising a surfactant having a polymerizable group.

9. The actinic-ray-curable ink composition according to claim 8, wherein the surfactant having a polymerizable group includes a silicone-based surfactant.

10. The actinic-ray-curable ink composition according to claim 8, wherein a content ratio of the surfactant having a polymerizable group relative to a total mass of the actinic-ray-curable ink composition is from 0.5 mass % to 10 mass %.

11. The actinic-ray-curable ink composition according to claim 1, wherein, on a mass basis, a ratio of a content of the di(meth)acrylate having a linear alkylene group to a content of the cyclohexyldienone-based polymerization inhibitor is from 20 to 3000.

12. The actinic-ray-curable ink composition according to claim 1, wherein, on a mass basis, a ratio of a content of the di(meth)acrylate having a linear alkylene group to a content of the di(meth)acrylate having an alkylene oxide chain is from 0.8 to 9.5.

13. The actinic-ray-curable ink composition according to claim 1, wherein a total content ratio of the di(meth)acrylate having a linear alkylene group and the di(meth)acrylate having an alkylene oxide chain relative to a total mass of the actinic-ray-curable ink composition is from 55 mass % to 95 mass %.

14. The actinic-ray-curable ink composition according to claim 1, wherein a coloring agent is not included.

15. An ink jet recording method comprising:
ejecting, onto a recording medium, the actinic-ray-curable ink composition according to claim 1 by an ink jet method; and
irradiating the ejected actinic-ray-curable ink composition with an actinic ray to cure the actinic-ray-curable ink composition.

16. The actinic-ray-curable ink composition according to claim 1, wherein in the di(meth)acrylate having a linear alkylene group, the alkylene group has 9 or more carbon atoms.

* * * * *